US007692674B2

(12) United States Patent
Kamada et al.

(10) Patent No.: US 7,692,674 B2
(45) Date of Patent: Apr. 6, 2010

(54) LIQUID CRYSTAL DISPLAY

(75) Inventors: Tsuyoshi Kamada, Kawasaki (JP);
Yohei Nakanishi, Kawasaki (JP);
Kazuya Ueda, Kawasaki (JP); Hidefumi Yoshida, Kawasaki (JP); Hideaki Tsuda, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 1047 days.

(21) Appl. No.: 11/314,005

(22) Filed: Dec. 22, 2005
(Under 37 CFR 1.47)

(65) Prior Publication Data
US 2007/0013633 A1 Jan. 18, 2007

(30) Foreign Application Priority Data
Dec. 27, 2004 (JP) .............................. 2004-377569

(51) Int. Cl.
*G09G 5/02* (2006.01)
(52) U.S. Cl. .......................................... 345/694; 345/87
(58) Field of Classification Search ................... 345/87, 345/89–92, 690–696, 698; 348/254, 674
See application file for complete search history.

(56) References Cited
U.S. PATENT DOCUMENTS

| 4,840,460 | A | | 6/1989 | Bernot et al. |
| 5,124,695 | A | * | 6/1992 | Green .......................... 345/103 |
| 5,126,865 | A | | 6/1992 | Sarma |
| 5,805,136 | A | * | 9/1998 | Silverbrook et al. ......... 345/695 |
| 5,808,594 | A | * | 9/1998 | Tsuboyama et al. ........... 345/89 |
| 6,335,778 | B1 | | 1/2002 | Kubota et al. |
| 6,636,193 | B1 | * | 10/2003 | Asao et al. ..................... 345/96 |
| 6,714,212 | B1 | * | 3/2004 | Tsuboyama et al. ......... 345/696 |
| 7,116,297 | B2 | * | 10/2006 | Koga et al. ..................... 345/87 |
| 7,429,981 | B2 | * | 9/2008 | Shimoshikiryoh ........... 345/204 |
| 2002/0047822 | A1 | | 4/2002 | Senda et al. |
| 2004/0021677 | A1 | * | 2/2004 | Sasaki et al. ................. 345/694 |
| 2004/0239698 | A1 | * | 12/2004 | Kamada et al. .............. 345/714 |
| 2006/0103800 | A1 | | 5/2006 | Li et al. |

FOREIGN PATENT DOCUMENTS

| JP | 2-12 (A) | 1/1990 |
| JP | 3076938 (B2) | 6/2000 |
| JP | 2002-333870 (A) | 11/2002 |
| KR | 1998-18232 | 6/1998 |
| KR | 10-2004-0062751 | 7/2004 |

* cited by examiner

*Primary Examiner*—Richard Hjerpe
*Assistant Examiner*—Tom V Sheng
(74) *Attorney, Agent, or Firm*—Harness, Dickey & Pierce, P.L.C.

(57) ABSTRACT

The invention relates to a liquid crystal display used in a television receiver or a display section of an electronic apparatus and provides a liquid crystal display having a wide viewing angle and high viewing angle characteristics. The viewing angle characteristics of low gradations are improved by the capacitive coupling HT method. The viewing angle characteristics of high gradations above the intermediate gradation are improved by the driving HT method. A liquid crystal is driven using the capacitive coupling HT method and the driving HT method in combination to combine the effect of improvement of both methods, thereby improving the viewing angle characteristics of a liquid crystal display for a wide range from a low gradation to a high gradation.

18 Claims, 23 Drawing Sheets

FIG.8

| FREQUENCY [Hz] | FRAME RATIO (T1 : T2) | | |
|---|---|---|---|
| | 1:1 | 1:2 | 1:3 |
| 60 | × | × | × |
| 80 | × | × | × |
| 100 | × | × | × |
| 120 | ○ | × | × |
| 140 | ○ | × | × |
| 160 | ○ | × | × |
| 180 | ○ | ○ | × |

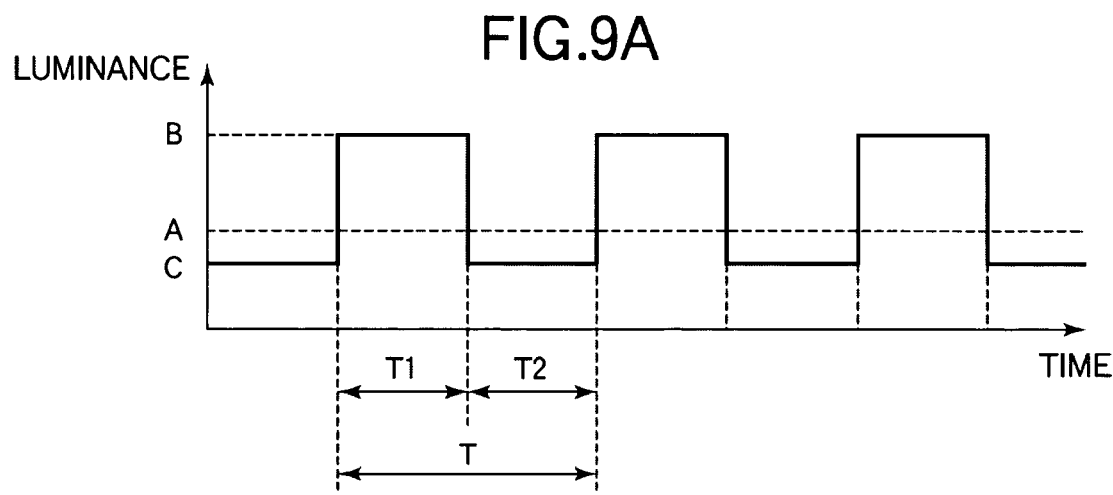
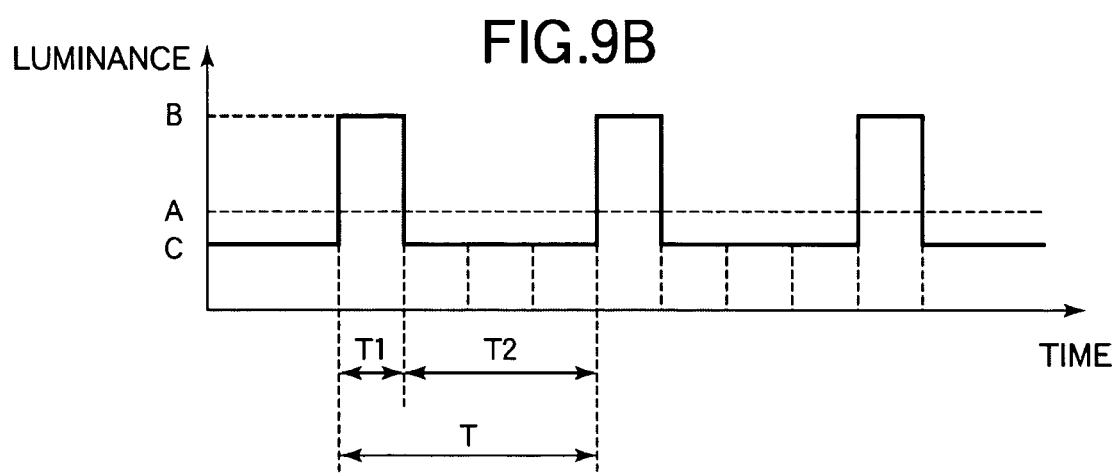

FIG.10A

| FREQUENCY [Hz] | FRAME RATIO (T1 : T2) | | |
|---|---|---|---|
| | 1 : 1 | 1 : 2 | 1 : 3 |
| 60 | × | × | × |
| 80 | × | × | × |
| 100 | × | × | × |
| 120 | ○ | ○ | ○ |
| 140 | ○ | ○ | ○ |
| 160 | ○ | ○ | ○ |
| 180 | ○ | ○ | ○ |

FIG.10B

| FREQUENCY [Hz] | FRAME RATIO (T1 : T2) | | |
|---|---|---|---|
| | 1 : 1 | 1 : 2 | 1 : 3 |
| 60 | ○ | ○ | ○ |
| 80 | ○ | ○ | △ |
| 100 | ○ | △ | × |
| 120 | ○ | × | × |
| 140 | △ | × | × |
| 160 | × | × | × |
| 180 | × | × | × |

FRAME 1   FRAME 2   FRAME 3   FRAME 4

FRAME 1   FRAME 2   FRAME 3   FRAME 4

FIG.12A

| DISTANCE FROM SCREEN (cm) | HT DIVISIONAL LUMINANCE RATIO | | | | |
|---|---|---|---|---|---|
| | UNPROCESSES | 1:1 | 1:3 | 1:7 | 1:15 |
| 10 | ◎ | ○ | × | × | × |
| 20 | ◎ | ○ | ○ | × | × |
| 30 | ◎ | ◎ | ○ | ○ | × |
| 40 | ◎ | ◎ | ◎ | ○ | × |
| 50 | ◎ | ◎ | ◎ | ○ | ○ |
| 60 | ◎ | ◎ | ◎ | ◎ | ○ |
| 70 | ◎ | ◎ | ◎ | ◎ | ○ |
| 80 | ◎ | ◎ | ◎ | ◎ | ○ |
| 90 | ◎ | ◎ | ◎ | ◎ | ◎ |
| 100 | ◎ | ◎ | ◎ | ◎ | ◎ |
| 110 | ◎ | ◎ | ◎ | ◎ | ◎ |

FIG.12B

| DISTANCE FROM SCREEN (cm) | HT DIVISIONAL LUMINANCE RATIO | | | | |
|---|---|---|---|---|---|
| | UNPROCESSES | 1:1 | 1:3 | 1:7 | 1:15 |
| 10 | ◎ | × | × | × | × |
| 20 | ◎ | ○ | × | × | × |
| 30 | ◎ | ○ | × | × | × |
| 40 | ◎ | ◎ | ○ | × | × |
| 50 | ◎ | ◎ | ○ | × | × |
| 60 | ◎ | ◎ | ◎ | ○ | × |
| 70 | ◎ | ◎ | ◎ | ○ | × |
| 80 | ◎ | ◎ | ◎ | ◎ | ○ |
| 90 | ◎ | ◎ | ◎ | ◎ | ○ |
| 100 | ◎ | ◎ | ◎ | ◎ | ◎ |
| 110 | ◎ | ◎ | ◎ | ◎ | ◎ |

LIQUID CRYSTAL DISPLAY

BACKGROUND OF THE INVENTION

1. Field of the Invention

The present invention relates to a liquid crystal display used in a television receiver or a display section of an electronic apparatus.

2. Description of the Related Art

FIGS. 22A and 22B show an example of a configuration of an MVA (Multi-domain Vertical Alignment) type liquid crystal display. FIG. 22A schematically shows a sectional structure of a liquid crystal display panel 101. FIG. 22B shows a structure of one pixel of the MVA type liquid crystal display panel 101 as viewed in a direction normal to the display screen. As shown in FIGS. 22A and 22B, the liquid crystal display panel 101 has a TFT substrate 102 on which thin film transistors (TFTs) 110 are formed and an opposite substrate 103 on which a common electrode and a color filter (CF) layer are formed. The substrates 102 and 103 are combined using a peripheral sealing material 105. A liquid crystal layer 104 is sealed between the substrates 102 and 103. A predetermined gap (cell gap) is maintained by spacers 106 between the TFT substrate 102 and the opposite substrate 103. The call gap may be maintained at the predetermined value by spacers in the form of protrusions instead of the spacers 106. A polarizer 107 is disposed, for example, on a crossed Nicols basis on each of surfaces of the TFT substrate 102 and the opposite substrate 103 opposite to the sides of the substrate facing each other. A mounting terminal 108 for mounting a liquid crystal driving IC (not shown) is formed on the TFT substrate 102.

As shown in FIG. 22B, the TFT substrate 102 includes a gate bus line 112 formed to extend in the horizontal direction in the figure and a drain bus line 111 formed to extend in the vertical direction in the figure across the gate bus line 112 with an insulation film interposed between them. A TFT 110 for driving the pixel is formed in the vicinity of an intersection between the bus lines 111 and 112. A part of the gate bus line 112 serves as a gate electrode of the TFT 110. A drain electrode (D) of the TFT 110 is electrically connected to a drain bus line 111. A source electrode (S) of the TFT 110 is electrically connected to a pixel electrode 109 formed in a pixel region defined by the bus lines 111 and 112. A storage capacitor bus line 117 is formed so as to extend across the pixel region in parallel with the gate bus line 112. A storage capacitor electrode (intermediate electrode) 116 is formed at each pixel above storage capacitor bus line 117 with an insulation film interposed between them. A storage capacitor Cs is formed by the storage capacitor bus line 117, the storage capacitor electrode 116, and the insulation film sandwiched between them.

The pixel electrode 109 is formed with slits 114 which are blanks in the electrode material. Linear protrusions 115 are formed on the opposite substrate 103. The slits 114 and the linear protrusions 115 serve as alignment regulating structures for regulating the direction in which liquid crystal molecules (not shown) in the liquid crystal layer 104 are tilted when a voltage is applied. The pixel region is divided into domains in which liquid crystal molecules are tilted in four respective directions because of the slits 114 and the linear protrusions 115. Since the liquid crystal 103 is tilted in four directions, a bias of the viewing angle of the display panel is leveled when compared to that of a liquid crystal display in which a liquid crystal is tilted only in one direction. A significant improvement in viewing angle characteristics is thus achieved. Such a technique is referred to as a domain division technique.

FIG. 23 schematically shows a sectional structure of an MVA type liquid crystal display employing the domain division technique. FIG. 23A shows a state of the section observed when no voltage is applied to the liquid crystal layer 104. FIGS. 23B and 23C show a state observed when a voltage is applied to the liquid crystal layer 104. Referring to FIGS. 23A and 23B, the linear protrusions 115 serving as alignment regulating structures are formed on both of the opposite substrate 103 on which the pixel electrode 118 and a vertical alignment film 119 are formed in the order listed and the TFT substrate 102 on which the pixel electrode 109 is formed. Referring to FIG. 23C, the slits 114 serving as alignment regulating structures are formed only on the TFT substrate 102. Although not shown, the linear protrusions 115 may be provided on only one of the substrates.

As shown in FIG. 23A, liquid crystal molecules 120 are aligned substantially perpendicularly to a surface of the TFT substrate 102 when no voltage is applied. When a voltage is applied between the substrates 102 and 103, as shown in FIG. 23B, the liquid crystal molecules 120 are tilted in directions which are determined by the shape of the linear protrusions 115. As shown in FIG. 23C, when a voltage is applied between the substrates 102 and 103 in the structure formed with the slits 114, the tilting direction of the liquid crystal molecules 120 is determined by an effect of an electric field generated in the liquid crystal layer 104. Although not shown, some known liquid crystal display panels have a structure in which linear protrusions 115 are formed on either of substrates 102 and 103 and in which slits 114 are formed on the other substrate. Such a structure is most commonly used in existing MVA type liquid crystal displays.

Patent Document 1: JP-A-2-12
Patent Document 2: U.S. Pat. No. 4,840,460
Patent Document 3: Japanese Patent No. 3,076,938
Patent Document 4: JP-A-2002-333,870

FIG. 24 is a graph showing transmittance characteristics relative to applied voltages (T-V characteristics) of a VA (Vertically Aligned) type liquid crystal display. The abscissa axis represents voltages (V) applied to the liquid crystal layer, and the ordinate axis represents light transmittance. The curve A connecting black circles in the figure indicates T-V characteristics in a direction perpendicular to the display screen (hereinafter referred to as a square direction). The curve B connecting asterisks in the figure indicates T-V characteristics in a direction at an azimuth angle of 90° and a polar angle of 60° to the display screen (hereinafter referred to as an oblique direction). An azimuth angle is an angle measured counterclockwise with reference to the direction to the right of the display screen. A polar angle is an angle to a line vertical to the center of the display screen.

As shown in FIG. 24, there is a distortion of transmittance (luminance) in the vicinity of the region enclosed by the circle C. For example, transmittance in the oblique direction is higher than transmittance in the square direction for relatively low gradations appearing a voltage of about 2.5 V is applied, whereas the transmittance in the oblique direction is lower than the transmittance in the square direction for relatively high gradations appearing when a voltage of about 4.5 V is applied. As a result, there are small differences in luminance within the range of effective driving voltages when the screen is viewed in the oblique direction. This phenomenon is most significantly observes as variation of a color.

FIGS. 25A and 25B show variation of a view of an image displayed on a display screen. FIG. 25A shows the image as viewed in a direction square to the screen, and FIG. 25B shows the image as viewed in an oblique direction. As shown in FIGS. 25A and 25B, when the display screen is viewed in the oblique direction, the color of the image appears more whitish than the view in the square direction.

FIGS. 26A, 26B, and 26C show gradation histograms of three primary colors, i.e., red (R), green (G), and blue (B) in a reddish image. FIG. 26A shows a gradation histogram of red. FIG. 26B shows a gradation histogram of green. FIG. 26C shows a gradation histogram of blue. The abscissa axes of FIGS. 26A to 26C represent gradations (256 gradations at levels 0 to 255), and the ordinate axes represent rates of presence (%). As shown in FIGS. 26A to 26C, relatively high gradations of red and relatively low gradations of green and blue are present in this image at high rates of presence. When such an image is displayed on the display screen of a VA type liquid crystal display and viewed in an oblique direction, red which is a light tone turns relatively darker, and green and blue which are dark tones turn relatively lighter. Since differences in luminance between the three primary colors consequently become small, the color of the screen as a whole becomes whitish.

As thus described, an MVA type or VA type liquid crystal display is excellent in viewing angle characteristics in a direction square to the same. However, the liquid crystal display has a problem in that its viewing angle characteristics are not satisfactory because the display screen as a whole appears in a whitish color when it is viewed in a direction oblique to the same. The problem described similarly occurs on a liquid crystal display of the TN (Twisted Nematic) type that is a driving method according to the related art.

SUMMARY OF THE INVENTION

It is an object of the invention to provide a liquid crystal display having a wide viewing angle and high viewing angle characteristics.

The above-described object is achieved by a liquid crystal display characterized in that it includes a liquid crystal sealed between a pair of substrates provided opposite to each other, a plurality of pixels provided in a form of a matrix on either of the pair of substrates, a thin film transistor formed at each of the pixels, an image processing unit for determining a high luminance of the pixel in a high-luminance frame and a low luminance of the pixel in a low-luminance frame and the ratio of presence between the high-luminance frame and the low-luminance frame to achieve luminance substantially equal to predetermined luminance by combining the high-luminance frame which drives the pixel to luminance higher than the predetermined luminance that is associated with a gradation value in input image data and the low-luminance frame which drives the pixel to luminance lower than the predetermined luminance, a first sub-pixel formed in the pixel, and a second sub-pixel which is formed in the pixel separately from the first sub-pixel and which provides luminance per unit area lower than that of the first sub-pixel.

The invention makes it possible to provide a liquid crystal display having a wide viewing angle and high viewing angle characteristics.

MODE FOR CARRYING OUT THE INVENTION

Figure 7A:
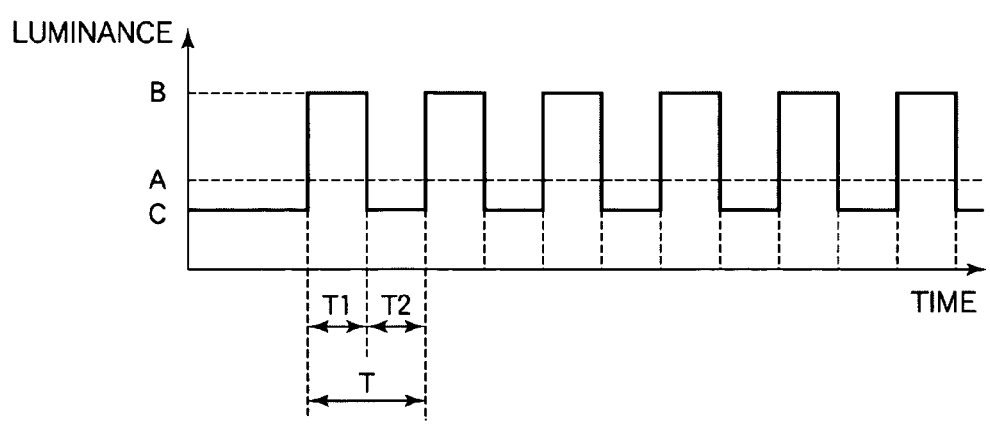
Figure 7B:
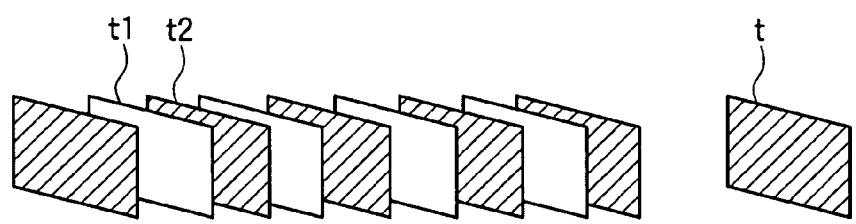
Figure 11A:
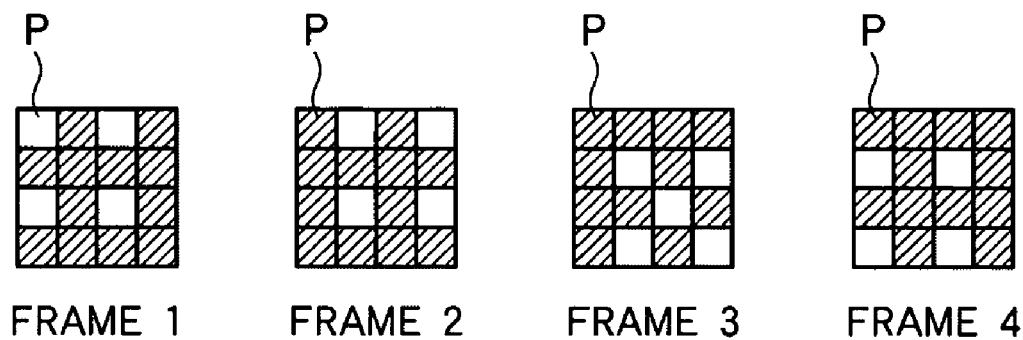
Figure 11B:
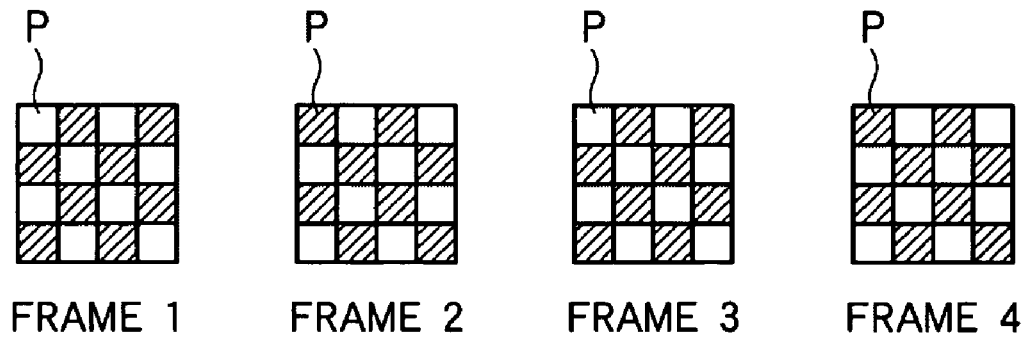
Figure 13:
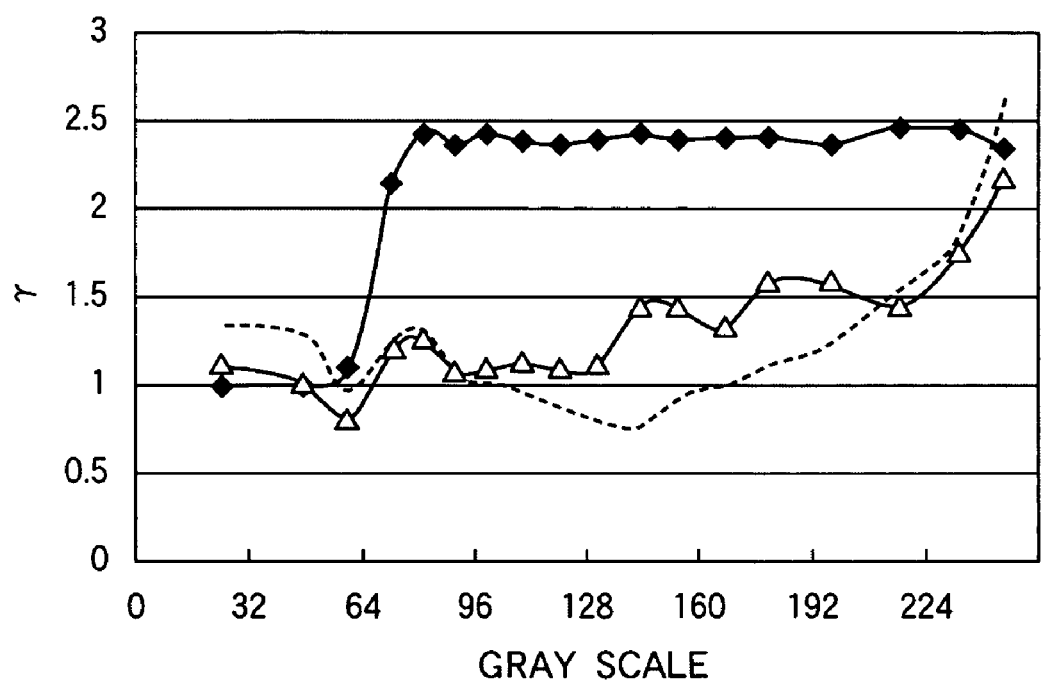
Figure 14:
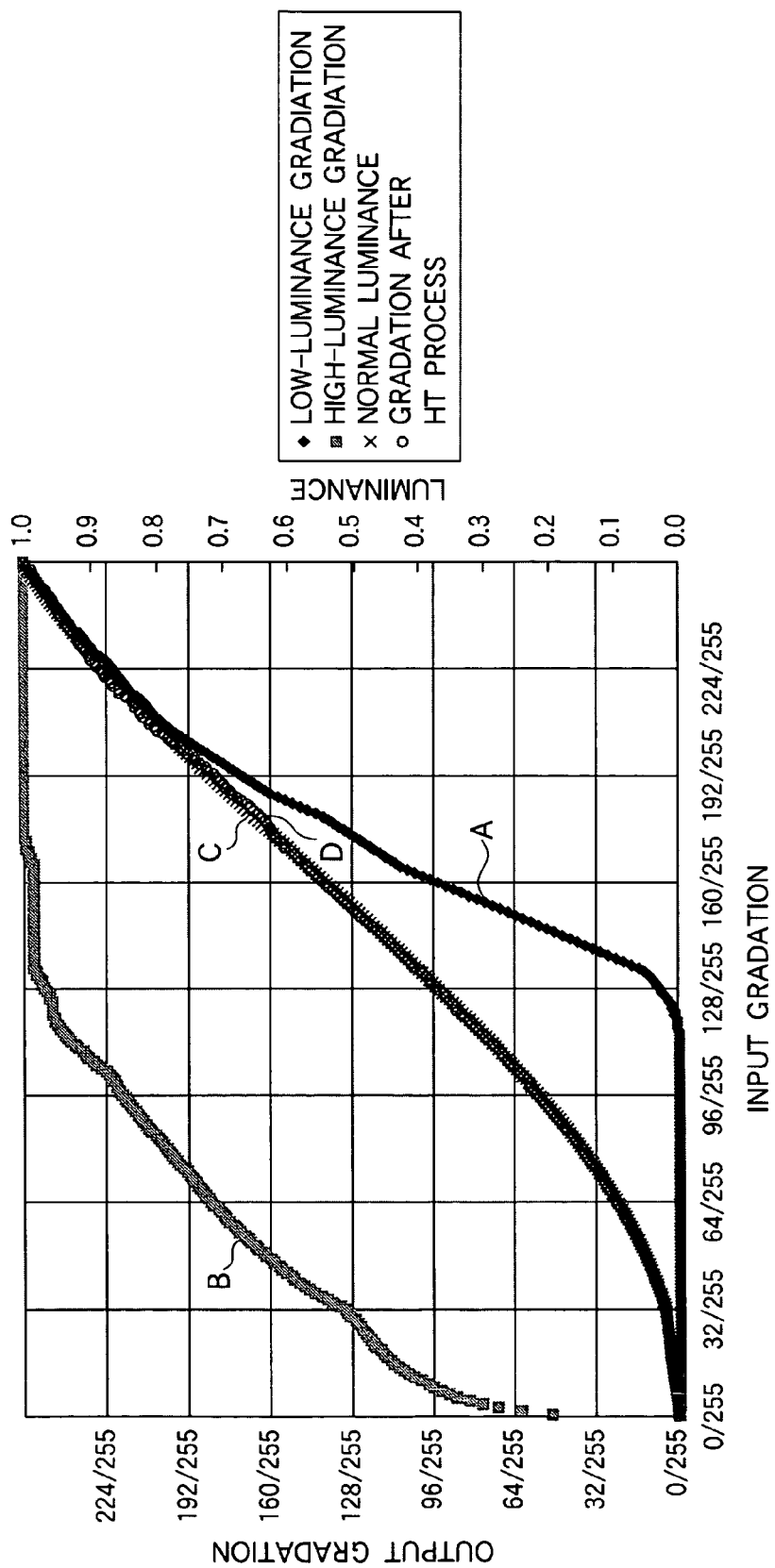
Figure 15A:
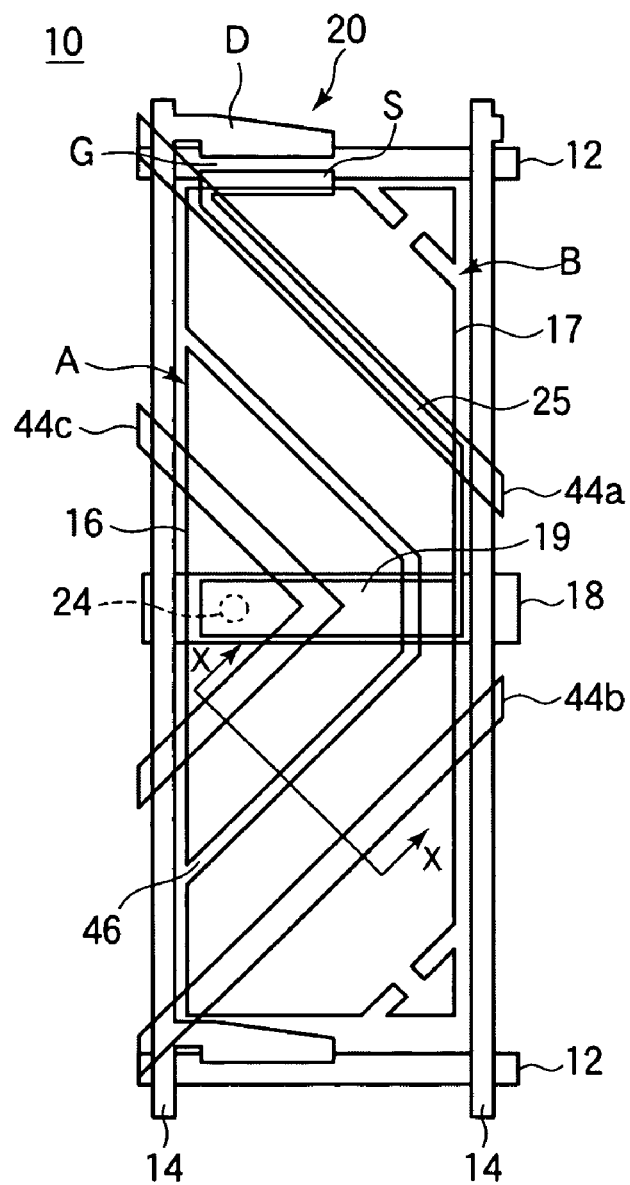
Figure 15B:
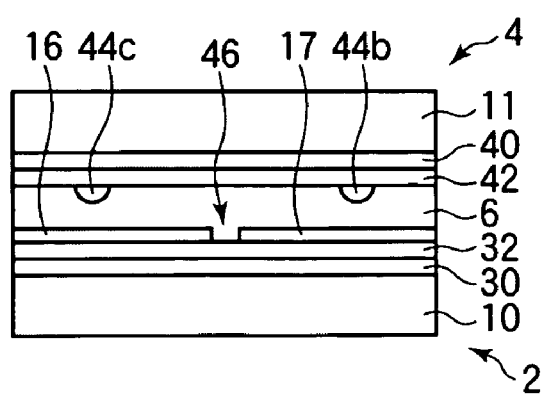
Figure 16:
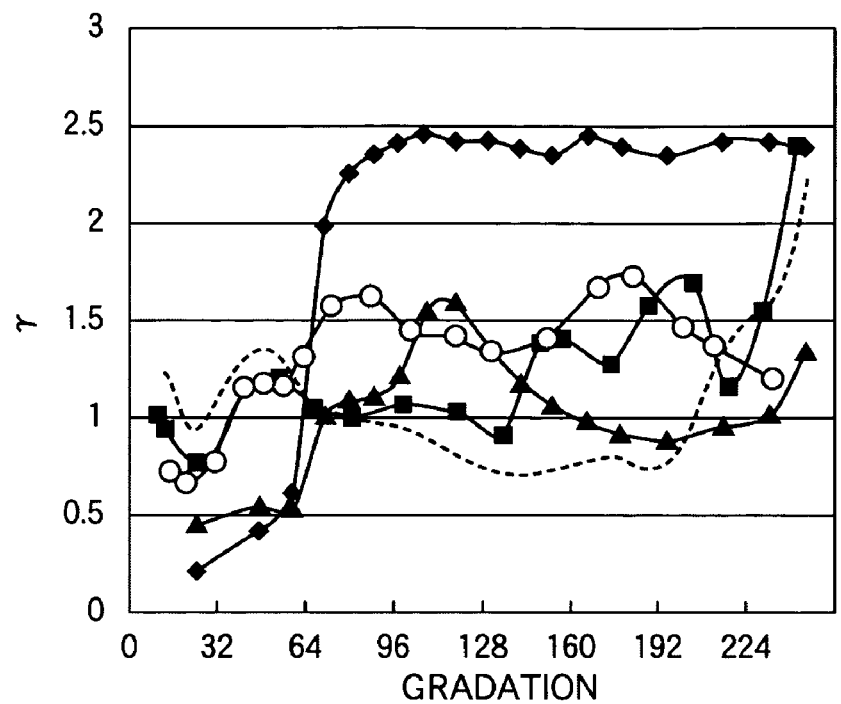
Figure 17:
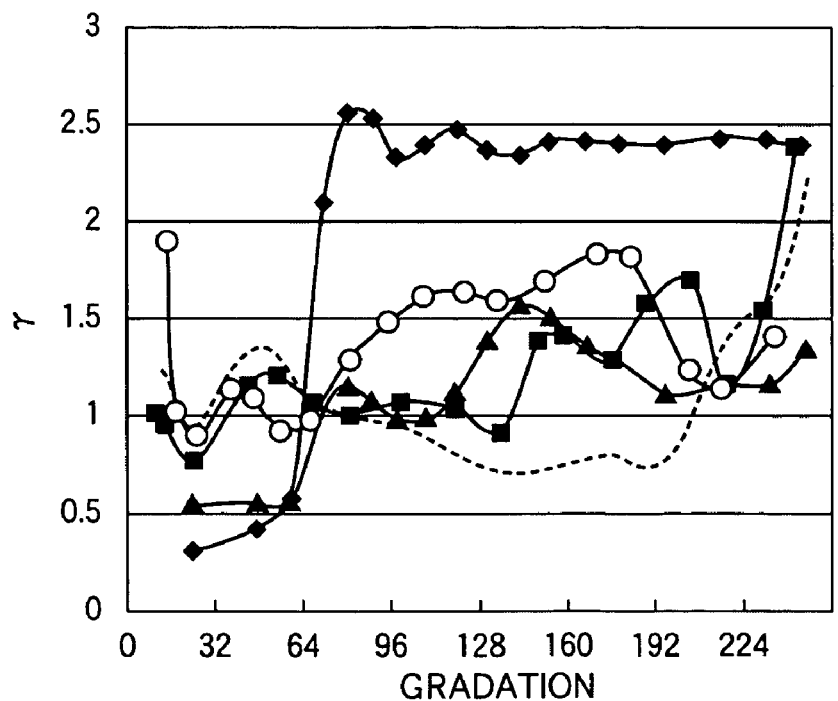
Figure 18:
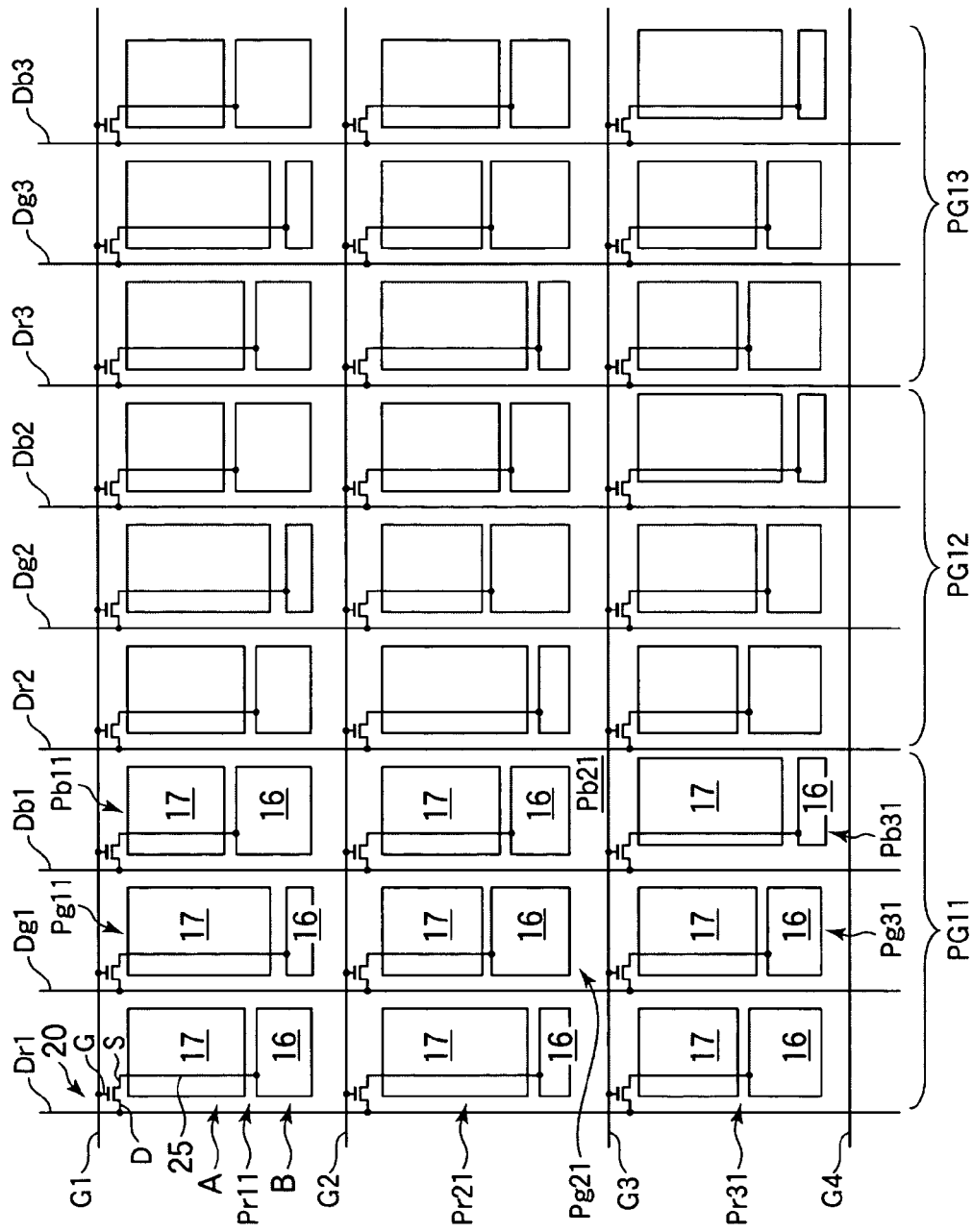
Figure 19:
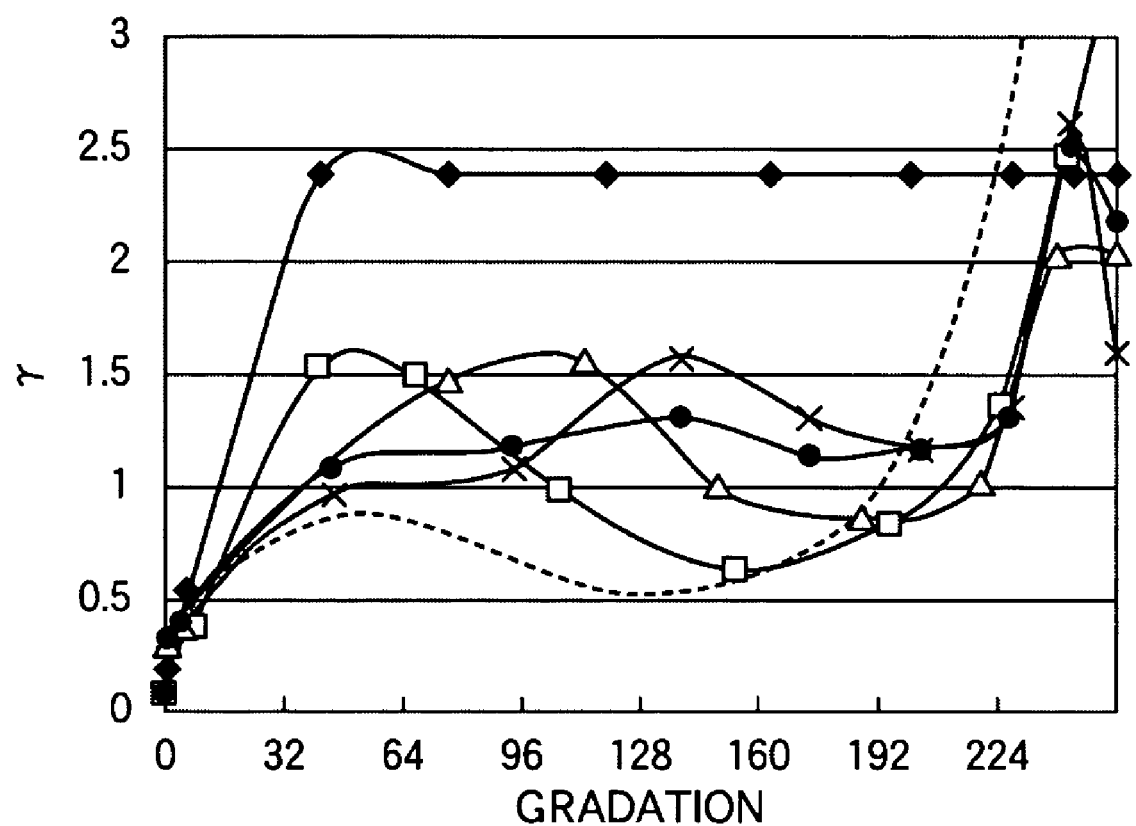
Figure 20:
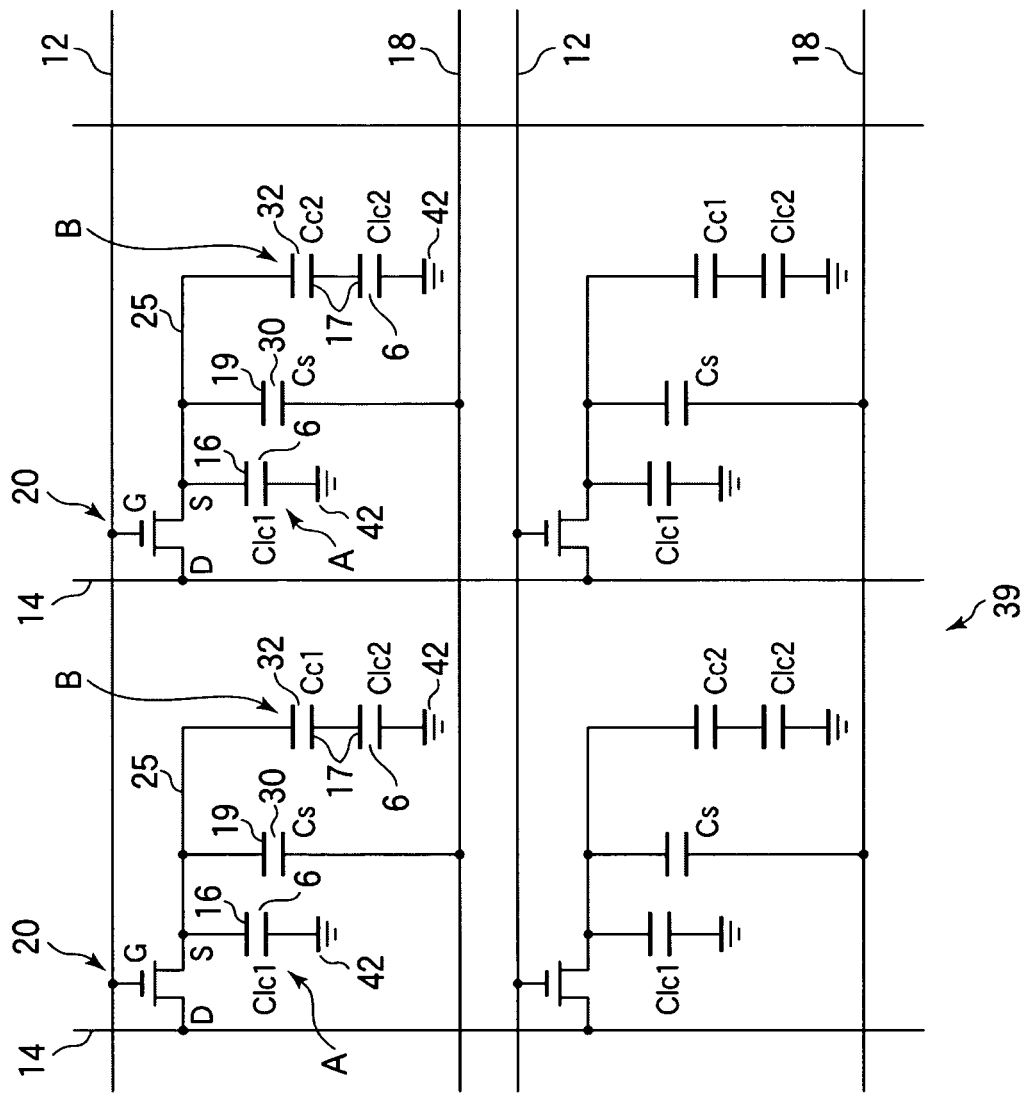
Figure 21:
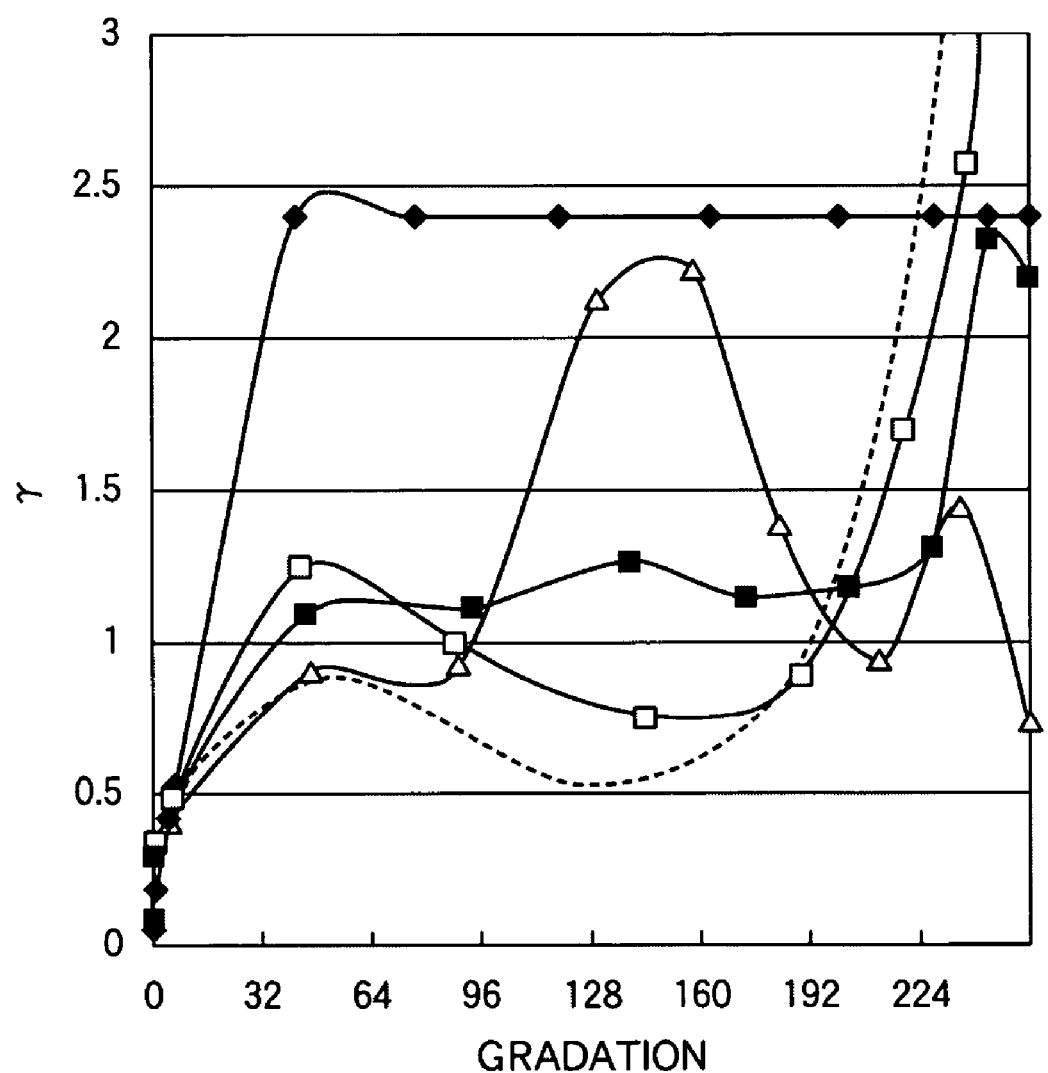
Figure 22A:
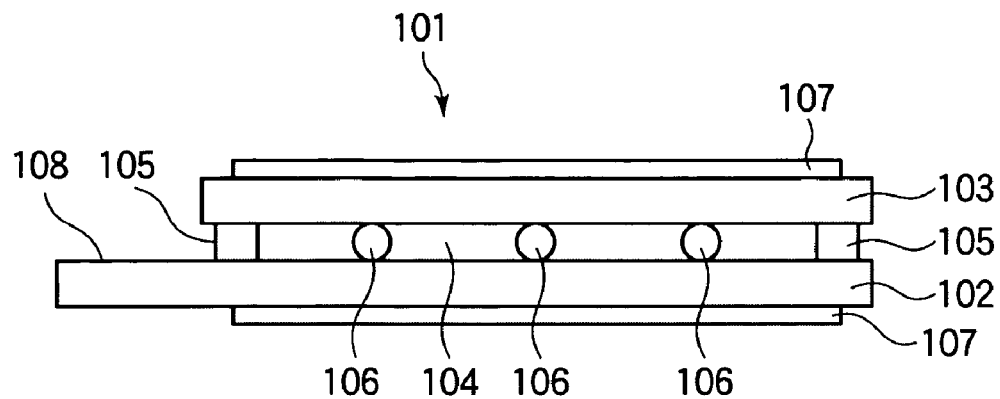
Figure 22B:
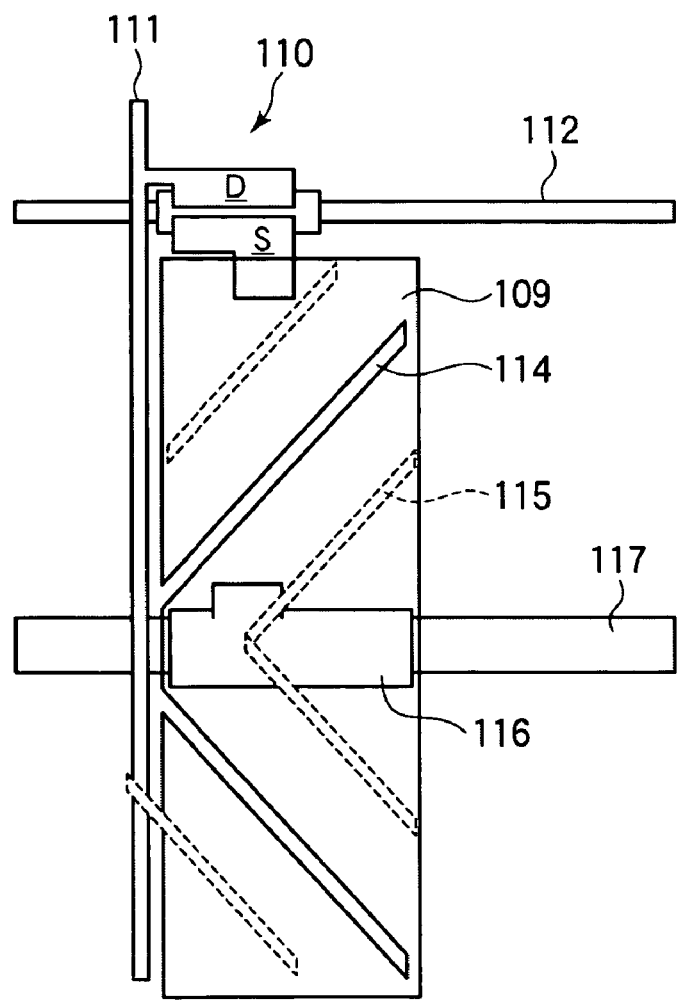
Figure 23A:
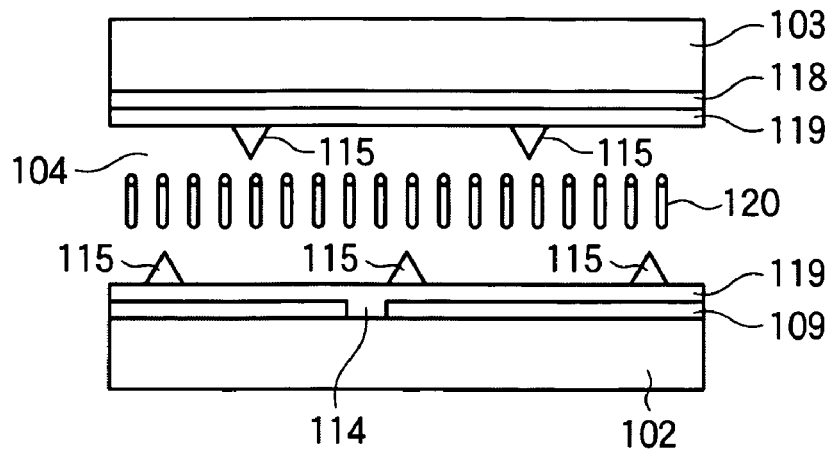
Figure 23B:
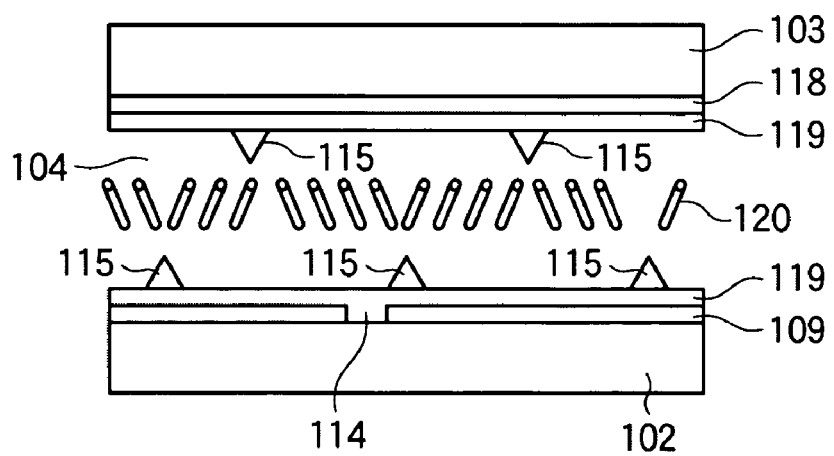
Figure 23C:
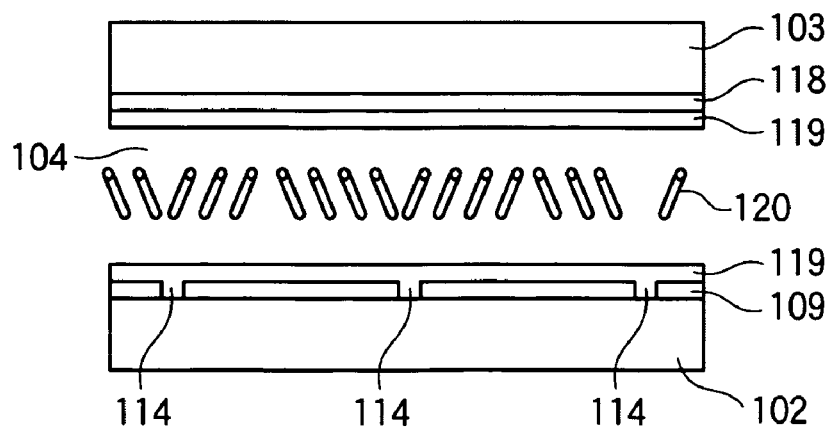
Figure 24:
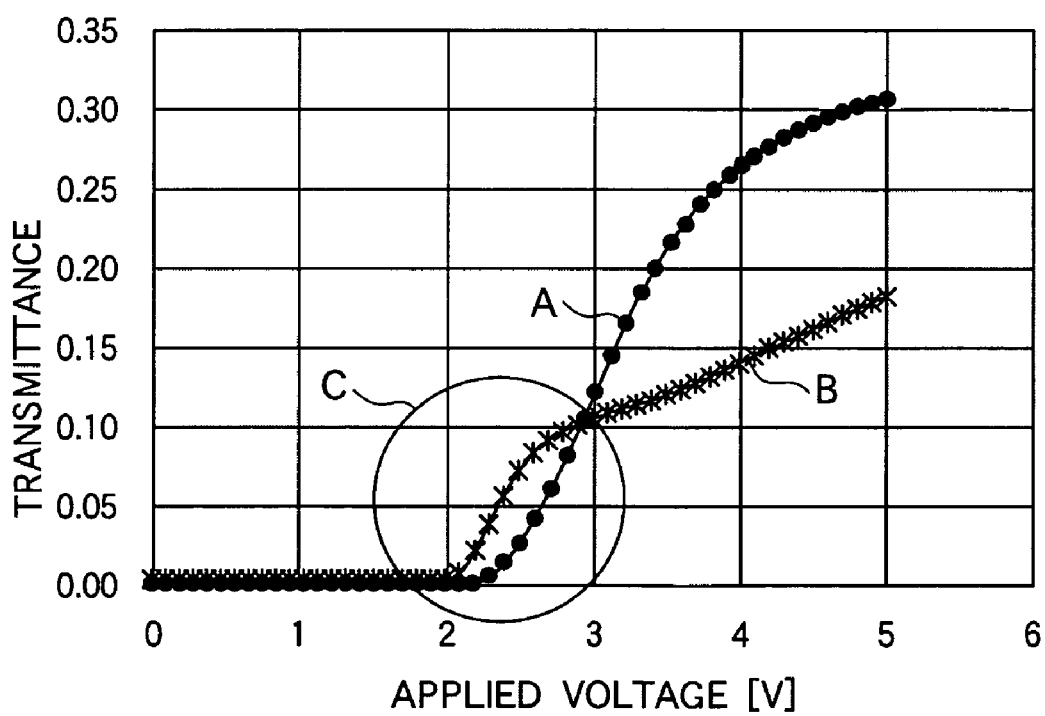
Figure 25A:
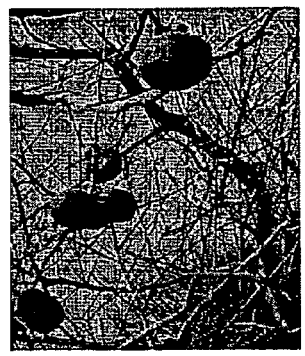
Figure 25B:
Figure 26A:
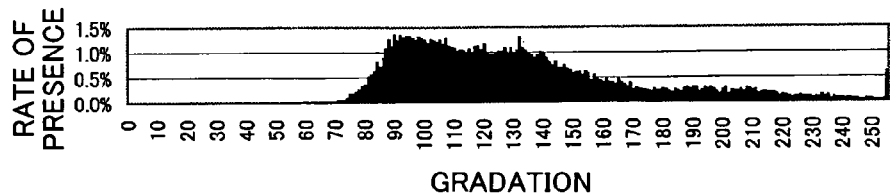
Figure 26B:
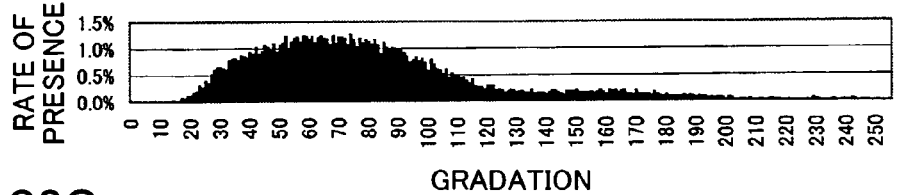
Figure 26C:
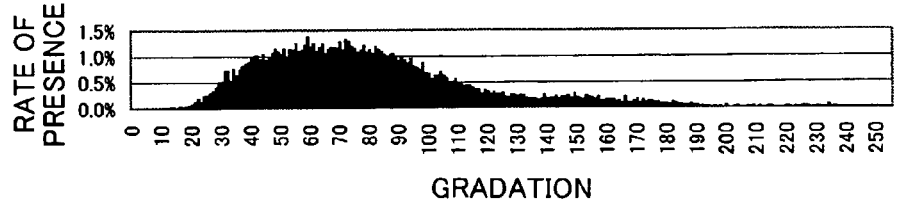

FIGS. 7A and 7B illustrate the principle of the driving HT method employed in a liquid crystal display in the first mode for carrying out the invention;

FIG. 8 shows a relationship between driving conditions of the driving HT method and the occurrence of flickers in the liquid crystal display in the first mode for carrying out the invention;

FIGS. 9A and 9B show examples of setting of the driving frequency of each of high-luminance frames T1 and low-luminance frames T2 when the driving frequency of one set of frames T is fixed according to the driving HT method employed in the liquid crystal display in the first mode for carrying out the invention;

FIGS. 10A and 10B show results of a visual check on states of display of the liquid crystal display in the first mode for carrying out the invention according to the driving HT method;

FIGS. 11A and 11B illustrate the driving HT method which makes it possible to suppress flickers in the liquid crystal display in the first mode for carrying out the invention;

FIGS. 12A and 12B show results of visual evaluation on influence of granularity appearing on the liquid crystal display in the first mode for carrying out the invention when the driving HT method is used;

FIG. 13 is a graph showing viewing angle characteristics of liquid crystal displays in the first mode for carrying out the invention employing the driving HT method;

FIG. 14 is a gradation conversion table used for the liquid crystal display in the first mode for carrying out the invention;

FIGS. 15A and 15B show a structure of one pixel of the liquid crystal display in the first mode for carrying out the invention;

FIG. 16 shows viewing angle characteristics of Embodiment 1 of the liquid crystal display in the first mode of carrying out the invention;

FIG. 17 shows viewing angle characteristics of Embodiment 2 of the liquid crystal display in the first mode of carrying out the invention;

FIG. 18 shows a structure of a pixel group PGin of a liquid crystal display in a second mode for carrying out the invention;

FIG. 19 shows viewing angle characteristics of the liquid crystal display in the second mode for carrying out the invention;

FIG. 20 shows an equivalent circuit of a pixel group 39 in a liquid crystal display in a third mode for carrying out the invention;

FIG. 21 shows viewing angle characteristics of the liquid crystal display in the third mode for carrying out the invention;

FIGS. 22A and 22B show configurations of a vertically aligned liquid crystal display according to the related art;

FIGS. 23A, 23B and 23C schematically show sectional configurations of a vertically aligned liquid crystal display according to the related art employing a domain division technique;

FIG. 24 shows T-V characteristics of a vertically aligned liquid crystal display according to the related art;

FIGS. 25A and 25B show a difference between views of an image displayed on a display screen; and FIGS. 26A, 26B, and 26C show gradation histograms of red, green, and blue in a reddish image.

DESCRIPTION OF THE PREFERRED EMBODIMENTS

[First Mode for Carrying Out the Invention]

Figure 1:
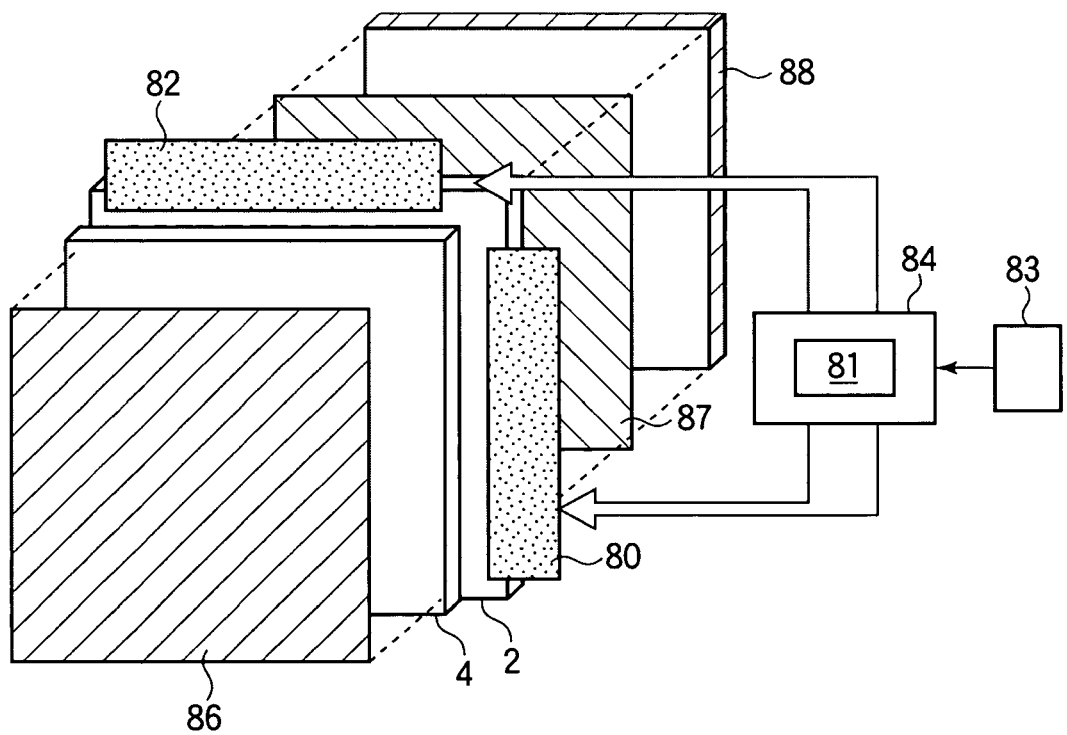
FIG. 1 shows a schematic configuration of a liquid crystal display in a first mode for carrying out the invention.

A liquid crystal display in a first mode for carrying out the invention will now be described with reference to FIGS. 1 to 17. First, a schematic configuration of the liquid crystal display in the present mode for carrying out the invention will be described with reference to FIG. 1. FIG. 1 shows a schematic configuration of the liquid crystal display in the present mode for carrying out the invention. As shown in FIG. 1, the liquid crystal display includes a TFT substrate 2 having gate bus lines and drain bus lines formed across each other with an insulation film interposed between them and a TFT formed at each pixel. A pixel has first and second sub-pixels which are separate from each other. Therefore, the liquid crystal display can be driven using the halftone grayscale method (capacitive coupling HT method) which relies on capacitive coupling to be described later. The liquid crystal display also includes an opposite substrate 4 which is formed with color filters and a common electrode and a liquid crystal layer 6 (not shown in FIG. 1) which is sealed between the substrates 2 and 4 and which has, for example, negative dielectric constant anisotropy.

The TFT substrate 2 is connected to a gate bus line driving circuit 80 loaded with a driver IC for driving a plurality of gate bus lines and a drain bus line driving circuit 82 loaded with a driver IC for driving a plurality of drain bus lines. The driving circuits 80 and 82 output scan signals and data signals to predetermined gate bus lines and drain bus lines based on predetermined signals output by a control circuit 84.

The control circuit 84 incorporates an image processing unit 81 which performs a driving halftone grayscale process (driving HT process) to be described later. It is not essential that the image processing unit 81 is a circuit incorporated in the control circuit 84, and it may be a component separate from the control circuit 84. Further, it is not essential that the image processing unit 81 is a physical circuit, and it may be a program executed in the control circuit 84. A storage circuit 83 for storing a gradation conversion table to be used for the driving HT method is connected to the driving circuit 84. The storage circuit 83 may be incorporated in the control circuit 84.

A polarizer 87 is provided on a surface of the TFT substrate 2 opposite to the surface thereof on which the TFT elements are formed, and a polarizer 86 is provided on a surface of the opposite substrate 4 opposite to the surface thereof on which the common electrode is formed, the polarizer 86 being in a crossed Nicols relationship with the polarizer 87. A backlight unit 88 is provided on a surface of the polarizer 87 opposite to the surface thereof on the side of the TFT substrate 2.

Figure 2:
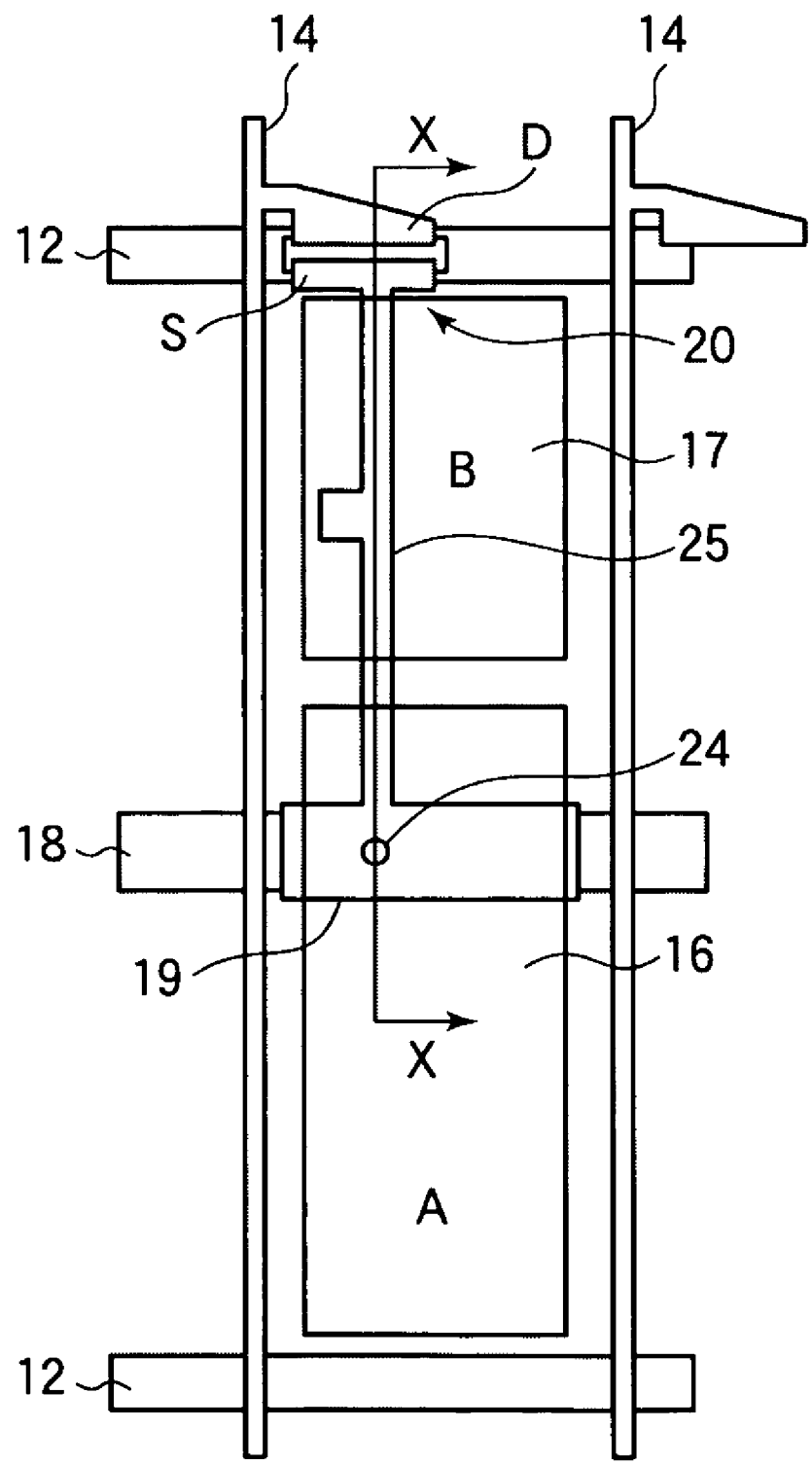
FIG. 2 is a view of the liquid crystal display in the first mode for carrying out the invention showing a basic configuration of one pixel used in a capacitive coupling HT method.
Figure 3:
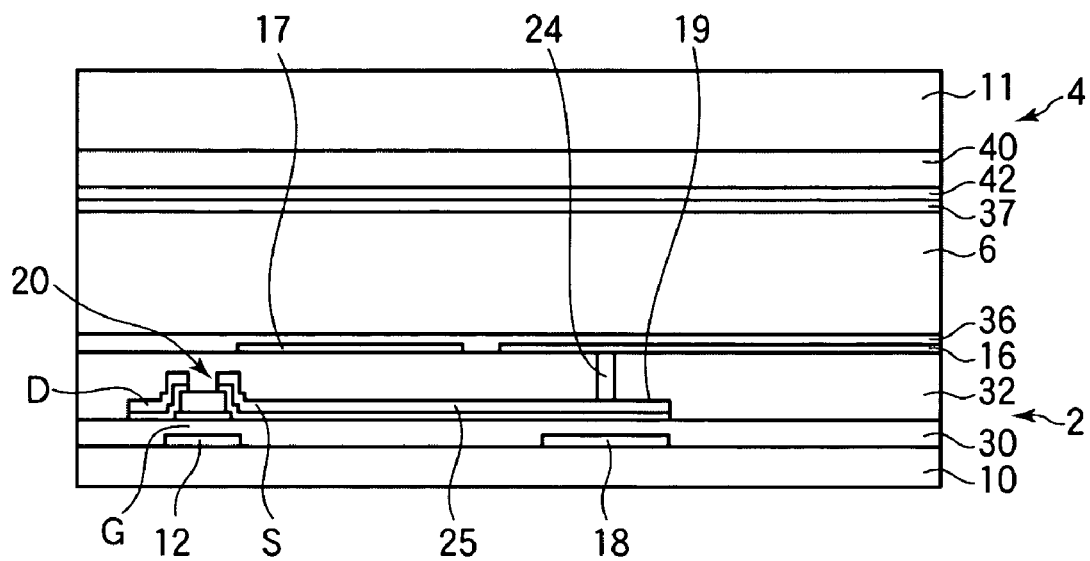
FIG. 3 is a view of the liquid crystal display in the first mode for carrying out the invention showing a basic sectional configuration of one pixel used in the capacitive coupling HT method.
Figure 4:
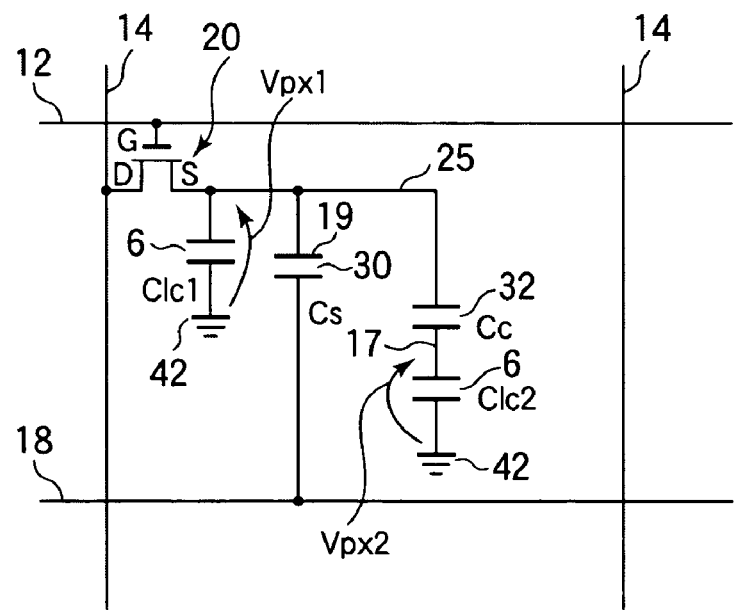
FIG. 4 shows an equivalent circuit of the one basic pixel of the liquid crystal display in the first mode for carrying out the invention for which the capacitive coupling HT method is used.

The capacitive coupling HT method will now be described with reference to FIGS. 2 to 5. The capacitive coupling HT method is a technique for improving viewing angle characteristics as described above. Patent Documents 1 to 3 disclose capacitive coupling HT processes to be implemented in a TN type liquid crystal display. FIG. 2 shows a configuration of one pixel of a fundamental liquid crystal display based on such known techniques. FIG. 3 shows a configuration of a section of the liquid crystal display along the line X-X in FIG. 2. FIG. 4 shows an equivalent circuit of one pixel of the liquid crystal display. As shown in FIGS. 2 to 4, the liquid crystal display has a thin film transistor (TFT) substrate 2, an opposite substrate 4, and a liquid crystal layer 6 sealed between the substrates 2 and 4.

The TFT substrate 2 has a plurality of gate bus lines 12 formed on a glass substrate 10 and a plurality of drain bus lines 14 formed across the gate bus lines 12 with an insulation film 30 interposed between them. TFTs 20 are provided in the vicinity of intersections between the gate bus lines 12 and the drain bus lines 14, one TFT being formed at each pixel as a switching element. A part of a gate bus line 12 serves as a gate electrode of a TFT 20, and a drain electrode (D) of the TFT 20 is electrically connected to a drain bus line 14. Storage capacitor bus lines 18 are formed across pixel regions defined by the gate bus lines 12 and the drain bus lines 14 so as to extend in parallel with the gate bus lines 12. A storage capacitor electrode (intermediate electrode) 19 is formed above the storage capacitor bus line 18 at each pixel with an insulation film 30 interposed between them. The storage capacitor electrode 19 is electrically connected to a source electrode (S) of the TFT 20 through a control electrode 25. A storage capacitor Cs is formed by the storage capacitor bus line 18, the storage capacitor electrode 19, and the insulation film 30 sandwiched between them.

A pixel region defined by gate bus lines 12 and drain bus lines 14 is divided into a sub-pixel (first sub-pixel) A and a sub-pixel (second sub-pixel) B. A pixel electrode (first pixel electrode) 16 is formed at the sub-pixel A, and a pixel electrode (second pixel electrode) 17, which is separate from the pixel electrode 16, is formed at the sub-pixel B. The pixel electrode 16 is electrically connected to the storage capacitor electrode 19 and the source electrode (S) of the TFT 20 though a contact hole 24. The pixel electrode 17 has an area which overlaps the control electrode 25 with a protective film 32 interposed between them. In the same area, a control capacitance Cc is formed by the pixel electrode 17, the control electrode 25, and the protective film 32 sandwiched by the electrodes 17 and 25. The pixel electrode 17 is indirectly connected to the source electrode (S) by capacitive coupling through the control capacitance Cc. The pixel electrode 17 is in an electrical floating state.

The opposite substrate 4 has a color filter (CF) resin layer 40 formed on a glass substrate 11 and a common electrode 42 formed on the CF resin layer 40. A liquid crystal capacitance Clc1 is formed between the pixel electrode 16 of the sub-pixel A and the common electrode 42. A liquid crystal capacitance Clc2 is formed between the pixel electrode 17 of the sub-pixel B and the common electrode 42. The liquid crystal capacitance Clc2 and the control capacitance Cc are connected in series between the substrates 2 and 4. Alignment films 36 and 37 are formed at the interfaces between the TFT substrate 2 and the liquid crystal layer 6 and between the opposite substrate 4 and the layer 6, respectively.

Let us now assume that when a TFT 20 is turned on, a gradation voltage (a voltage associated with a gradation value in input image data) applied to the drain bus line 14 is applied to the pixel electrode 16 through the TFT 20 to apply a voltage Vpx1 to the liquid crystal layer 6 at the sub-pixel A. At this time, since the voltage Vpx1 is divided according to the capacitance ratio between the liquid crystal capacitance Clc2 and the control capacitance Cc, the pixel electrode 17 of the sub-pixel B is applied with a voltage different from that applied to the pixel electrode 16. A voltage Vpx2 applied to the liquid crystal layer 6 at the sub-pixel B is as follows.

$$Vpx2 = (Cc/(Clc2+Cc)) \times Vpx1 \qquad \text{Equation 1}$$

An actual ratio of the voltages (Vpx2/Vpx1 (=Cc/Clc2+Cc)) is an item to be designed based on display characteristics of the liquid crystal display of interest, and it is idealistically set in the range from 0.6 to 0.8.

When one pixel includes the sub-pixels A and B in which liquid crystal molecules in the liquid crystal layer 6 begin tilting at different voltages (threshold voltages) in response to the gradation voltage applied to the drain bus line 14 as thus described, a distortion in T-V characteristics as shown in FIG. 24 is distributed between the sub-pixels A and B. Thus, the capacitive coupling HT method makes it possible to suppress the phenomenon of whitish appearance of an image when viewed in an oblique direction and to thereby improve viewing angle characteristics. What is required for the capacitive coupling HT method is that sub-pixels having different threshold voltages are present in one pixel, and the method of providing different threshold voltages is not limited to capacitive coupling. For example, different threshold voltages may be provided by forming a dielectric body on the pixel electrode or changing the alignment or anchoring of liquid crystal molecules.

Figure 5:
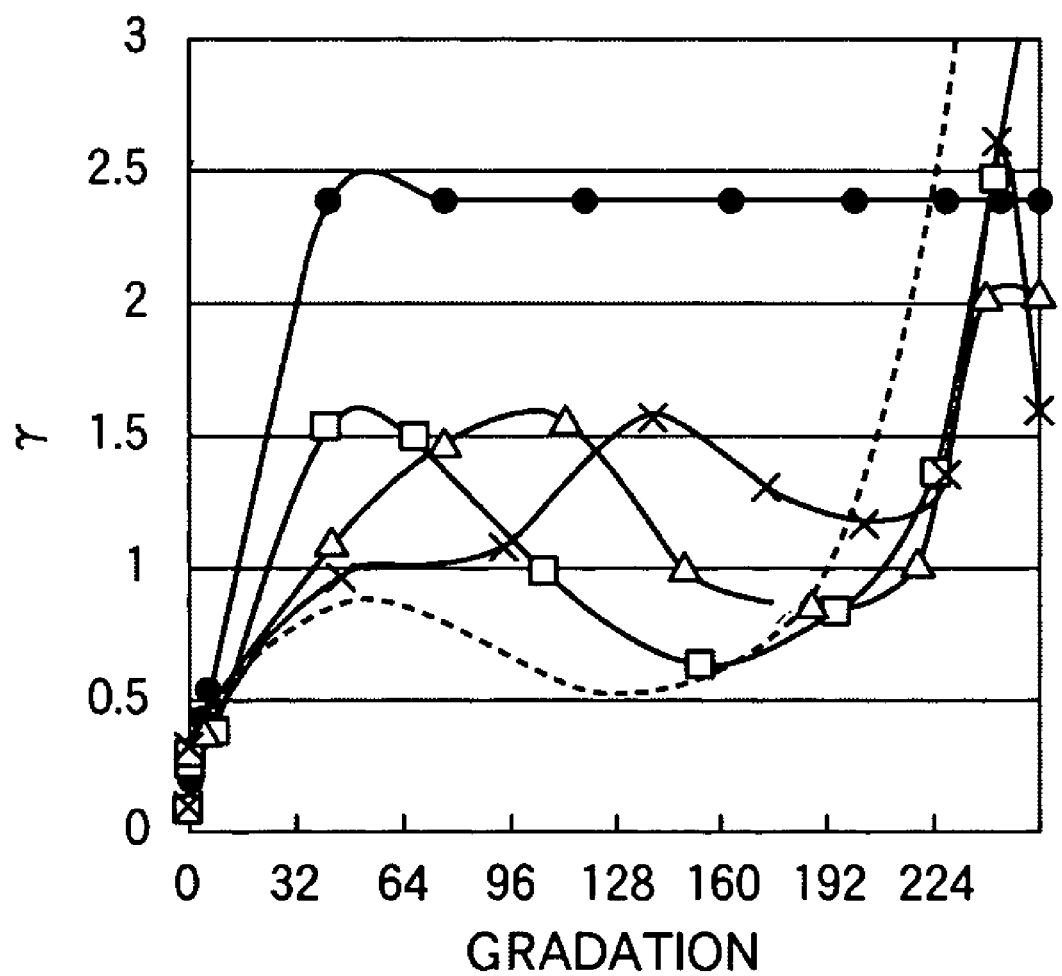
FIG. 5 shows viewing angle characteristics of a liquid crystal display in the first mode for carrying out the invention which is a VA type liquid crystal display employing the capacitive coupling HT method.

FIG. 5 is a graph showing viewing angle characteristics of VA type liquid crystal displays employing the capacitive coupling HT method. The abscissa axis represents gradations of image data to be displayed, and the ordinate axis represents γ-values. Referring now to optical characteristics of the display measured at a predetermined angle to a direction normal to the display screen, a γ-value is calculated as follows:

$$\gamma = \{\log(Ta) - \log(Tb)\}/\{\log(a) - \log(b)\} \qquad \text{Expression 2}$$

where T represents the maximum luminance; ta represents luminance based on a gradation value a at a predetermined angle of the same direction; tb represents luminance based on a gradation value b (a and b are different values); and Ta and Tb represent the ratios of the luminance ta and the luminance tb to the maximum luminance T, respectively.

The curve connecting black circles in the figure indicates characteristics in a direction square to the liquid crystal display employing the capacitive coupling HT method. The curve connecting squares in the figure indicates characteristics measured in a direction oblique to a liquid crystal display designed such that the ratio between the areas of a sub-pixel A and a sub-pixel B is 1:9 and such that a voltage ratio Vpx2/Vpx1 at an intermediate gradation (gradation level 127 among 255 gradations) is 0.72. The curve connecting triangles in the figure indicates characteristics measured in a direction oblique to a liquid crystal display designed such that the area ratio between a sub-pixel A and a sub-pixel B is 2:8 and such that the voltage ratio Vpx2/Vpx1 at the intermediate gradation (gradation level 127 among 255 gradations) is 0.67. The curve connecting crosses in the figure indicates characteristics measured in a direction oblique to a liquid crystal display designed such that the ratio between the areas of a sub-pixel A and a sub-pixel B is 4:6 and such that the voltage ratio Vpx2/Vpx1 at the intermediate gradation (gradation level 127 among 255 gradations) is 0.67. The curve shown in a broken line in the figure indicates characteristics of a VA type liquid crystal display according to the related art measured in a direction oblique to the same.

The viewing angle characteristics in the oblique direction in FIG. 5 are local γ-values at each gradation measured with the γ-value in the square direction set at 2.4. As indicated by Expression 2, a γ-value is greater, the greater the difference between the luminance ta and tb associated with the two relevant gradation values a and b. It is therefore possible to suppress variation of a color on a display screen attributable to a reduction in a difference in luminance if γ-values in oblique directions can be made relatively great. A liquid crystal display has idealistic viewing angle characteristics when the γ-value remains the same value as in the square direction, i.e., 2.4 for all gradations (at levels 0 to 255). As indicated by the broken line in the figure, in the case of the liquid crystal display which does not employ the capacitive coupling HT method, the γ-value is as low as 1 or less for a relative wide range of gradations, i.e., gradation levels 0 to 192, and viewing angle characteristics in an oblique direction are not satisfactory.

As indicated by the curves connecting square symbols, triangular symbols, and crosses respectively the figure, the liquid crystal displays employing the capacitive coupling HT method have significantly improved viewing angle characteristics and a maximum γ-value of 1.5 or more within the range of gradation levels from 0 to 224. For the purpose of improving viewing angle characteristics, it is idealistic to set the γ-value as closer to 2.4 as possible. However, when an image having a γ-value of 2.4 and an image having a γ-value of 1.5 are compared to each other, there is no significant difference in the state of display between those images. For this reason, the present specification is based on an assumption that $\gamma \geq 1.5$ is to be satisfied as a target value for an improvement of viewing angle characteristics.

Referring to FIG. 5, the range of gradations over which viewing angle characteristics are improved by the capacitive coupling HT method varies depending on the ratio between the areas of the sub-pixel A and the sub-pixel B. When the area of the sub-pixel B that is driven by capacitive coupling is made smaller, viewing angle characteristics are improved for gradations of greater values. For this reason, when images having relatively low gradations such as an image of black hair or flesh are frequently displayed, optimization may be performed by reducing the ratio of the area of the sub-pixel B to improve the viewing angle characteristics of the liquid crystal display. When images having relatively high gradations such as an image of human skin or white cloth are frequently displayed, optimization may be performed by increasing the ratio of the area of the sub-pixel B to improve the viewing angle characteristics of the liquid crystal display.

However, the improvement of viewing angle characteristics is achieved only in a relatively small range of gradations, i.e., about 30 to 40 gradations. Therefore, it is difficult to improve viewing angle characteristics in a relatively wide range of gradations reliably even when the capacitive coupling HT method is used.

Another known method of improving viewing angle characteristics is the driving HT method. The driving HT method will now be described with reference to FIGS. 6A to 13. The driving HT method is an image processing method involving the use of a combination of high-luminance frames in which pixels are driven to luminance higher than predetermined luminance associated with gradation values of input image data and low-luminance frames in which pixels are driven to luminance lower than the predetermined luminance. The values of luminance (hereinafter referred to as high luminance) of the pixels in the high-luminance frames and the luminance (hereinafter referred to as low luminance) of the pixels in the low-luminance frames and the ratio of presence between the high-luminance frames and the low-luminance frames are determined to achieve luminance substantially equal to the predetermined luminance. The predetermined luminance is luminance which is achieved when the driving HT method is not used.

Figure 6A:
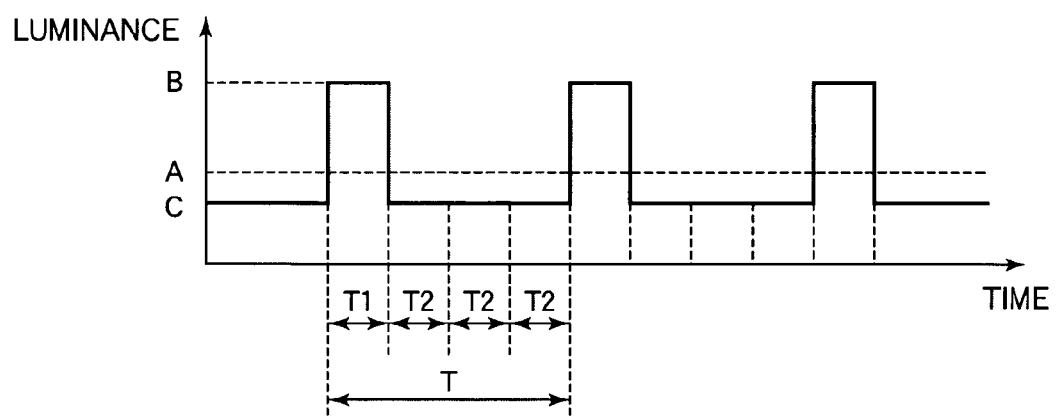
FIGS. 6A and 6B illustrate the principle of a driving HT method employed in a liquid crystal display in the first
Figure 6B:
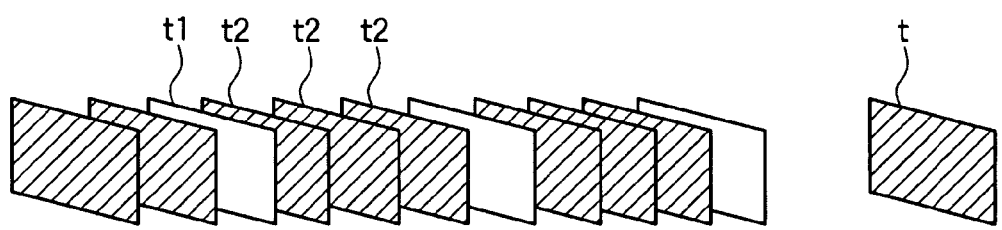

FIGS. 6A, 6B, 7A and 7B illustrate the principle of the driving HT method. FIGS. 6A and 7A show the ratio of presence between high-luminance frames and low-luminance frames. The abscissa axes of the figures represent time, and the ordinate axes represent the luminance of each frame. FIGS. 6B and 7B schematically show a display screen driven using the driving HT method. For a certain single pixel, there is provided high-luminance frames T1 having luminance higher than predetermined luminance A associated with gradation values of input image data and low-luminance frames T2 having luminance lower than the same. The high-luminance frames T1 have high luminance B (high luminance B>luminance A), and the low-luminance frames T2 have low luminance C (low luminance C<luminance A). The high luminance B and the low luminance C are set such that average luminance provided by a combination of the high-luminance frames T1 and the low-luminance frames T2 will equal the predetermined luminance A.

FIGS. 6A and 6B show an example in which the high-luminance frames T1 and low-luminance frames T2 are provided in a ratio of presence of 1:3 on a temporal basis. As shown in FIG. 6A, one high-luminance frame T1 is followed by three consecutive low-luminance frames T2. One high-luminance frame T1 and three low-luminance frames T2 as thus described constitute one set of frames T, and the frame set T is repeated in time sequence. For example, when a display screen as a whole is driven under such conditions, as shown in FIG. 6B, display screens t1 driven by the high-luminance frames T1 and display screens t2 driven by the low-luminance frames T2 are mixed and averaged in the direction of the time base and are consequently perceived as a display screen t having luminance substantially equal to the predetermined luminance A.

FIGS. 7A and 7B show an example in which the high-luminance frames T1 and low-luminance frames T2 are provided in a ratio of presence of 1:1 on a temporal basis. In this example, one high-luminance frame T1 and one low-luminance frame T2 constitute one set of frames T, and the frame set T is repeated in time sequence. For example, when a display screen as a whole is driven under such conditions, as shown in FIG. 7B, display screens t1 driven by the high-luminance frames T1 and display screens t2 driven by the low-luminance frames T2 are mixed and averaged in the direction of the time base and are consequently perceived as a display screen t having luminance substantially equal to the predetermined luminance A.

According to the driving HT method, intermediate gradations which are most vulnerable in terms of viewing angle characteristics are less frequently displayed, which results in an improvement in overall viewing angle characteristics. In this case, flickers are visually perceived on a screen as a whole when the entire screen or all pixels are simultaneously rendered with the high luminance or low luminance (or made bright or dark) as shown in FIGS. 6B and 7B.

FIG. 8 shows the presence or absence of flickers observed while varying the frame ratio between the high-luminance frames T1 and the low-luminance frames T2 (T1:T2) and the driving frequency of one frame set T. Referring to the circles and crosses in the table, the circles indicate that no flicker is visually perceived, and the crosses indicate that flickers are visually perceived. When a difference between high and low luminance is generated by repeatedly displaying frames that render the entire screen with high luminance and frames that render the screen with low luminance as descried above, such a difference will be perceived by human eyes as a flicker. Such flickers can be mitigated by increasing the frequency thereof. In particular, it is known that flicker components are visually unperceivable at a frequency of 60 Hz or more.

Therefore, as shown in FIG. 8, the frame ratio (T1:T2) is set at 1:1, and the driving frequency for one frame set T is increased to 120 Hz which is twice the driving frequency for one frame (60 Hz) of an ordinary liquid crystal display. As a result, the high-luminance frames T1 are display at a frequency of 60 Hz (=120 Hz/2). Similarly, the low-luminance frames T2 are display at a frequency of 60 Hz (=120 Hz/2). Flickers will therefore become less visually perceivable. However, when the frame ratio (T1:T2) is set at 1:2, the high-luminance frames T1 are displayed at a frequency of 40 Hz (=120 Hz/3), for example, when the driving frequency for one frame set T is 120 Hz. Since the frequency is thus substantially decreased, flickers cannot be sufficiently suppressed.

Similarly, when the frame ratio (T1:T2) is set at 1:3, the high-luminance frames T1 are displayed at a frequency of 30 Hz (=120 Hz/4), for example, when the driving frequency for one frame set T is 120 Hz, and flickers cannot be sufficiently suppressed. The high-luminance frames T1 and the low-luminance frames T2 must be driven at a higher frequency, the greater the difference between the display periods of the frames. It is quite difficult to set the driving frequency for one frame set T at a value that is three times or more of the driving frequency of one frame of the liquid crystal display because loads on peripheral driving circuits (the control circuit 84, the gate driver IC, and the source driver IC) will increase, although the difficulty is related to the resolution of the display screen.

This problem can be solved by a method in which the driving frequency of one frame set T is fixed and in which each of the frames T1 and T2 is driven at different frequencies. FIGS. 9A and 9B show examples of setting of the driving frequency of each of the frames T1 and T2 when the driving frequency of one frame set T is fixed at 120 Hz. FIG. 9A shows an example of setting in which the frame ratio (T1:T2) is 1:1, and FIG. 9B shows an example in which the frame ratio (T1:T2) is 1:3. The abscissa axes in the figures represent time, and the ordinate axes represent luminance.

As shown in FIGS. 9A and 9B, when the driving frequency of one frame set T is fixed at 120 Hz, the frequency of display of a high-luminance frame T1 or low-luminance frame T2 is remains at the same value of 60 Hz even if the driving frequency each of the frames T1 and T2 is changed. It is therefore possible to suppress the generation of flickers on the display screen.

FIGS. 10A and 10B show results of a visual check on states of display according to the driving HT method. FIG. 10A shows results of a visual check on whether flickers are generated or not. FIG. 10B shows results of a visual check on the effect of improving viewing angle characteristics. Referring to the circles and crosses in the FIG. 10A, a circle indicates that no flicker is visually perceived, and a cross indicates that flickers are visually perceived. Referring to the circles, triangles and crosses in FIG. 10B, a circle indicates that viewing angle characteristics are improved; a triangle indicates that the characteristics are improved to a level at which no problem occurs in practical use; and a cross indicates that there is no improvement. As shown in FIG. 10A, the frequency of display of a high-luminance frame T1 or low-luminance frame T2 is 60 Hz or higher when the driving frequency of one frame set T is fixed at 120 Hz or higher. Therefore, there is no flicker when the frame ratio (T1:T2) is set at any of 1:1, 1:2, and 1:3.

However, since it becomes difficult for the response speed of the liquid crystal to catch up with the driving frequency of one frame set T as the frequency increases (as the frame period becomes shorter), the effect of improving viewing angle characteristics is gradually lost as shown in FIG. 10B. If the response speed of liquid crystals is increased in the future, an improvement of gradation/luminance characteristics may be achieved event at higher driving frequencies. However, even if the response speed of liquid crystals is increased, it is still true that the prevention of flickers and the improvement of viewing angle characteristics can be more easily achieved, the closer the frame ratio (T1:T2) to 1:1.

The optimum condition for achieving both of the prevention of flickers and the effect of improving viewing angle characteristics at the response speed of existing liquid crystals is the condition that the frame ratio (T1:T2) is 1:1 and that the frequency of one frame set T is 120 Hz under which a circle is marked on both of FIGS. 10A and 10B.

FIGS. 11A and 11B schematically show a predetermined group of pixels in a display area of a liquid crystal display to explain the driving HT method which makes it possible to suppress flickers. Specifically, sixteen pixels in the form of a 4×4 matrix is treated as one unit to show examples of setting for rendering each pixel light and dark. In FIG. 11A, the sixteen pixels in each frame are divided into light and dark pixels in a ratio of 1:3 such that edges of pixels having high luminance do not adjoin each other. In FIG. 11B, the sixteen pixels in each frame are divided into light and dark pixels in a ratio of 1:1 such that edges of pixels having high luminance do not adjoin each other. Further, the luminance of each pixel changes at an interval of a predetermined number of frames. For example, the luminance of each pixel in FIG. 11A is set to change in each frame such that it is cyclically rendered light and dark in a ratio of 1:3. Referring to a pixel P in this connection by way of example, the pixel P changes such that it will be light, dark, dark, and dark in the first to fourth frames, respectively.

In FIG. 11B, the luminance of each pixel is set to change in each frame such that it is cyclically rendered light and dark in a ratio of 1:1. Referring to the pixel P in this connection by way of example, the pixel P changes such that it will be light, dark, light, and dark in the first to fourth frames, respectively. By distributing light and dark spots in the display area based on a predetermined pattern as thus described, display can be performed without visually perceivable flickers.

FIGS. 12A and 12B show results of visual evaluation on influence of granularity that is generated on a display screen when the driving HT method shown in FIGS. 11A and 11B is used. FIG. 12A shows results of a visual check on a liquid crystal display having pixels provided at a pixel pitch of 0.3 mm. FIG. 12B shows results of a visual check on a liquid crystal display having pixels provided at a pixel pitch of 0.45 mm. The term "HT divisional luminance ratio" shown in FIGS. 12A and 12B represents the ratio of presence between high luminance and low luminance in the display screens. The driving frequency of one frame set T is 60 Hz. Referring to the double circles, circles, and crosses in FIGS. 12A and 12B, a double circle indicates that no granularity is perceived at all; a circle indicates that slight granularity is perceived, but it creates no problem in practical use; and a cross indicates that granularity is perceived to an uncomfortable level.

When the same image is displayed for a certain period of time just as in the case of display of a still image, the problem of granularity does not occur because the luminance of the image is averaged. According to the driving HT method, however, since both of light pixels and dark pixels instantaneously exist, a user perceives granularity when the image moves just as in the case of display of a motion picture or when the point of view moves. As shown on FIGS. 12A and 12B, granularity becomes more perceivable, the greater the ratio of pixels having low luminance in the display area. Further, granularity becomes more perceivable, the smaller the distance of the user to the display screen. When a user is close to a liquid crystal display in a state of the 60 Hz of the cycle of light and dark (one frame set T), the user is highly likely to feel granularity uncomfortable when the ratio of presence between high luminance and low luminance in one screen is other than 1:1. According to the driving HT method, although the ratio of presence between high luminance and low luminance in one screen may be set at a value other than 1:1, it is desirable to set the ratio of presence between high and low luminance at 1:1 in order to achieve high display quality.

Optimum conditions as follows must be satisfied to implement the driving HT method in order to achieve the effect of improving viewing angle characteristics, to maintain high image quality without flickers or granularity, and not to put loads on peripheral driving circuits as described above.

The frame ratio (T1:T2) of high-luminance frames and low-luminance frames is to be 1:1. The ratio of presence between high luminance and low luminance in one screen is to be 1:1. The driving frequency is to be 60 Hz. Those conditions will be hereinafter referred to as driving HT optimum conditions.

FIG. 13 is a graph showing viewing angle characteristics of VA type liquid crystal displays under the driving HT optimum conditions. The abscissa axis represents gradations of image data to be displayed, and the ordinate axis represents γ-values. The curve connecting black rhombuses in the figure indicates characteristics in a direction square to the liquid crystal display employing the driving HT method. The curve connecting triangles in the figure indicates characteristics measured in a direction oblique to the liquid crystal display employing the driving HT method. The curve shown in a broken line in the figure indicates characteristics of a VA type liquid crystal display according to the related art measured in a direction oblique to the same. The viewing angle characteristics in the oblique direction in FIG. 13 are local γ-values at each gradation measured with the γ-value in the square direction set at 2.4.

As shown in FIG. 13, the use of the driving HT optimum conditions allows an improvement in viewing angle characteristics of intermediate and high gradations (gradation levels from about 130 to 255). However, under the driving HT optimum conditions, the effect of improving viewing angle characteristics is not achieved for an image of low gradations (gradation level 100 and lower gradations). Although viewing angle characteristics of low gradations can be improved by setting a frame ratio (T1:T2) other than 1:1, flickers or granularity is generated. It is therefore difficult to achieve both of the effect of improving viewing angle characteristics and high image quality over a wide range of gradations using the driving HT method.

Under the circumstance, in a liquid crystal display in the present mode for carrying out the invention, the liquid crystal is driven using the capacitive coupling HT method and the driving HT method in combination to achieve both of the effect of improving viewing angle characteristics and high image quality. The driving conditions of the driving HT method are limited by the speed of response of a liquid crystal and restrictions originating from peripheral driving circuits. Under the circumstance, in the present mode for carrying out the invention, the driving conditions of the driving HT method are first decided, and the capacitive coupling HT method is optimized accordingly.

The mode of the invention will now be specifically described with reference to preferred embodiments.

Embodiment 1

In a liquid crystal of the present embodiment, the driving HT optimum conditions are used as the driving conditions of the driving HT method. FIG. 14 is a gradation conversion table showing high-luminance gradation values for obtaining high luminance in high-luminance frames and low-luminance gradation values for obtaining low luminance in low-luminance frames. The abscissa axis represents input gradations. The vertical axis on the left represents output gradations (converted gradations), and the vertical axis on the right represents luminance normalized with reference to the maximum luminance. The curve A connecting black rhombuses in the figure indicates low-luminance gradations, and the curve B connecting black squares indicates high-luminance gradation values. The curve C connecting crosses in the figure indicates normal luminance (predetermined luminance), and the curve D connecting circles in the figure indicates luminance after image processing according to the driving HT method (luminance after the HT process).

As shown in FIG. 14, for example, in the case of an input gradation level 128 among 255 gradations, a low-luminance frame is converted into gradation level 10 among 255 gradations according to the curve A, and a high-luminance frame is converted into gradation level 245 among 255 gradations according to the curve B. The ratio of the periods of those frames is 1:1, and luminance after the conversion actually displayed on the liquid crystal display is composite luminance of those frames, the resultant luminance (curve D) being about 38% of the maximum luminance. As apparent from the fact that the normal luminance (curve C) and the luminance after the HT process (curve D) indicate substantially the same characteristics, the luminance in the square direction is maintained at the level of the luminance of an image obtained without using the driving HT method even after the conversion. The gradation conversion table is merely shown as an example. The only restriction on the gradation conversion is that the luminance in the square direction should remain unchanged after the gradation conversion, and a gradation conversion table other than the table described above may be used as long as the restriction is followed.

The gradation conversion table is stored in a storage circuit 83 (see FIG. 1) and is read into a RAM (not shown) in an image processing unit 81 when the power supply of the liquid crystal display is turned on.

FIGS. 15A and 15B show a configuration of one pixel of the liquid crystal display of the present embodiment. FIG. 15A shows a configuration of one of a plurality of pixels formed like a matrix as viewed in a direction normal to a glass substrate 10. FIG. 15B is a view of a section taken along the line X-X shown in FIG. 15A. As shown in FIGS. 15A and 15B, a plurality of gate bus lines 12 and a plurality of drain bus lines 14 extending across the gate bus lines 12 are formed on the glass substrate 10 with an insulation film 30 interposed between the bus lines. A TFT 20 is provided at each pixel in the vicinity of an intersection between a gate bus line 12 and a drain bus line 14. A part of the gate bus line 12 serves as a gate electrode (G) of the TFT 20. An active semiconductor layer and a channel protective film (both of which are not shown) of the TFT 20 are formed above the gate bus line 12 with an insulation film interposed. A drain electrode (D) along with an n-type impurity semiconductor layer (not shown) underlying the same and a source electrode (S) along with an n-type impurity semiconductor layer (not shown) underlying the same are formed on the channel protection film of the TFT 20 above the gate electrode (G), the electrodes facing each other with a predetermined gap left between them.

Storage capacitor bus lines 18 are formed across pixel regions defined by the gate bus lines 12 and the drain bus lines 14 so as to extend in parallel with the gate bus lines 12. A storage capacitor electrode (intermediate electrode) 19 is formed above the storage capacitor bus line 18 at each pixel with an insulation film 30 interposed between them. The storage capacitor electrode 19 is electrically connected to the source electrode (S) of the TFT 20 through a control electrode 25. A storage capacitor Cs is formed by the storage capacitor bus line 18, the storage capacitor electrode 19, and the insulation film 30 sandwiched between them.

A pixel region defined by gate bus lines 12 and drain bus lines 14 is divided into a sub-pixel (first sub-pixel) A and a sub-pixel (second sub-pixel) B. The ratio (A:B) between the areas of the sub-pixel A and the sub-pixel B is 3:7. For example, the sub-pixel A, which has a trapezoidal shape, is disposed on the left side of a central part of the pixel region, and the sub-pixel B is disposed in upper and lower parts of the pixel region and at the right end of the central part excluding the region of the sub-pixel A. For example, the disposition of the sub-pixels A and B in the pixel region is substantially line symmetric about the storage capacitor bus line 18. A pixel electrode (first pixel electrode) 16 is formed at the sub-pixel A, and a pixel electrode (second pixel electrode) 17, which is separated from the pixel electrode 16 by a slit 46, is formed at the sub-pixel B. The pixel electrodes 16 and 17 are both constituted by a transparent conductive film such as an ITO. The pixel electrode 16 is electrically connected to the storage capacitor electrode 19 and the source electrode (S) of the TFT 20 though a contact hole 24 that is an opening in a protective film 32. The pixel electrode 17 has an area which overlaps the control electrode 25 with the protective film 32 interposed between them. In the same area, a control capacitance Cc (predetermined electric capacitance) is formed by the pixel electrode 17, the control electrode 25, and the protective film 32 sandwiched by the electrodes 17 and 25. The pixel electrode 17 is in an electrical floating state.

A CF resin layer 40 and a common electrode 42 are formed in the order listed on an opposite glass substrate 11 provided opposite to the glass substrate 10. A linear protrusion 44a serving as an alignment regulating structure for regulating the direction of alignment of liquid crystal molecules of a liquid crystal layer 6 is formed so as to protrude from the opposite glass substrate 11 in a position in which it faces the control electrode 25 extending diagonally in FIG. 15A. A linear protrusion 44b is formed so as to protrude from the opposite glass substrate 11 in a position in which it is substantially line symmetric with the protrusion 44a about the storage capacitor bus line 18. Further, a V-shaped linear protrusion 44c is formed above the pixel electrode 16 on the left side of the central part of the pixel region. The linear protrusion 44c is substantially line symmetric about the storage capacitor bus line 18.

At the sub-pixel A, a liquid crystal capacitance $Clc1$ is formed between the pixel electrode 16, the common electrode 42, and the liquid crystal layer 6 sandwiched between the electrodes 16 and 42. At the sub-pixel B, a liquid crystal capacitance $Clc2$ is formed between the pixel electrode 17, the common electrode 42, and the liquid crystal layer 6 sandwiched between the electrodes 17 and 42. The liquid crystal capacitance $Clc2$ is series-connected to the control capacitance Cc between the glass substrate 10 and the opposite glass substrate 11.

A voltage Vpx2 applied to the liquid crystal capacitance Clc2 at the sub-pixel B when the TFT 20 is turned on is obtained from Expression 1. In the present embodiment, a voltage ratio Vpx2/Vpx1 of the voltage Vpx2 applied to the liquid crystal capacitance Clc2 at the sub-pixel B to a voltage Vpx1 applied to the liquid crystal capacitance Clc1 at the sub-pixel A is set such that it will be 0.72 at an intermediate gradation (gradation level 127).

A gradation voltage (a voltage associated with a gradation value in input image data or a gradation value after conversion of gradation) applied to the drain bus line 14 is applied to the liquid crystal capacitance Clc1 at the sub-pixel A. As a result, luminance substantially equal to high luminance in a high-luminance frame or low luminance in a low-luminance frame is obtained at the sub-pixel A. A voltage lower than the gradation voltage applied to the drain bus line 14 is applied to the liquid crystal capacitance Clc2 at the sub-pixel B as indicated by Expression 1. As a result, luminance lower than the high luminance in a high-luminance frame or the low luminance in a low-luminance frame is obtained at the sub-pixel B.

FIG. 16 is a graph showing viewing angle characteristics of VA type liquid crystal displays. The abscissa axis represents gradations of image data to be displayed, and the ordinate axis represents γ-values. The curve connecting black rhombic symbols in the figure indicates characteristics of the liquid crystal display of the present embodiment obtained in a direction square to the same. The curve connecting triangular symbols in the figure indicates characteristics of a liquid crystal display in a direction oblique to the same obtained by driving it using only the capacitive coupling HT method without using the driving HT method. The curve connecting black squares in the figure indicates characteristics of a VA type liquid crystal display according to the related art in a direction oblique to the same obtained by driving it under the optimum HT driving conditions. The curve connecting circles in the figure indicates characteristics of the liquid crystal display of the present embodiment in a direction oblique to the same. The curve shown in a broken line in the figure indicates characteristics of a VA type liquid crystal display according to the related art employing neither the capacitive coupling HT method nor the driving HT method obtained in a direction oblique to the same. In FIG. 16, the viewing angle characteristics of each display in the oblique direction are measured with the γ-value for gradations of level 96 and higher in the square direction set at 2.4, and the characteristics represent local γ-values of each gradation.

As shown in FIG. 16, the γ-value of the VA type liquid crystal display according to the related art indicated by a broken line is 1.0 or less in a major range of gradations (gradations of level 200 and lower). As a result, sharpness of an image will be lost. Referring to the characteristics of the liquid crystal display employing only the capacitive coupling HT method (indicated by black triangles), the peak of the improvement in characteristics resides in the vicinity of gradation level 110 among 255 gradations, and the γ-value is 1.5 or more in a local range of gradation levels from about 100 to 120. Further, the γ-value is about 1.0 in other ranges of gradations, which means an improvement in the viewing angle characteristics.

Referring to the characteristics of the VA type liquid crystal display according to the related art obtained in a direction oblique thereto by driving the same it under the optimum HT driving conditions (indicated by black squares), the display has a γ-value of about 1.5 for gradations of level 140 and higher among the 255 gradations, which means an improvement in the characteristics of intermediate and high gradations. However, the γ-value is about 1.0 for low gradations, i.e., gradations of level 128 and lower among the 255 gradations. Referring to the characteristics of the liquid crystal display driven by using the capacitive coupling HT method and the driving HT method in combination (indicated by circles), it will be understood that the γ-value exceeds 1.5 in a quite wide range of gradation levels, i.e., from 64 to 192 among the 255 gradations. Such an improvement in characteristics is attributable to the fact that the region of low gradations is improved primarily by the capacitive coupling HT method and the region of high gradations above the intermediate gradation is primarily improved by the driving HT method to consequently combine the effect of improving viewing angle characteristics of both methods. When a high γ-value is achieved for a wide range of gradations, since viewing angle characteristics can be improved for any kind of image, it is possible to provide a liquid crystal display having very high display characteristics.

A high effect of improving viewing angle characteristics can be achieved by forming the sub-pixels A and B to combine the capacitive coupling HT method for varying the threshold voltage in the single pixel and the driving HT method for driving the pixel with high-luminance frames and low-luminance frames. By combining the HT techniques based on different principles, the effect of improvement provided by both techniques can be combined. As described above, it is relatively difficult to achieve an improvement for low gradations with the driving HT method because of restrictions on the driving conditions, although the method allows a significant improvement to be achieved for intermediate and high gradations. On the contrary, according to the capacitive coupling HT method in which a threshold voltage is varied, an improvement can be achieved for any gradation by appropriately setting the ratio between the areas of the sub-pixels A and B and the ratio Vpx2/Vpx1 of the voltages applied to the liquid crystal capacitances Clc1 and Clc2 formed at the sub-pixels A and B. However, it is difficult to achieve improved characteristics uniformly over a wide range of gradations using the capacitive coupling HT method.

Under the circumstance, a design may be conceived in which the driving HT method is used to improve intermediate and high gradations and in which gradations lower than the intermediate gradation are improved using an HT technique for varying the threshold voltage in one pixel such as the capacitive coupling HT method. As a result, viewing angle characteristics can be improved for a wide range including low and high gradations. In order to prevent the improvements achieved by the two HT methods from overlapping, for example, a measure is taken in the range of gradations of level 220 or lower (in a predetermined range of gradation values) to prevent gradation level 110 (gradation value α) among the 255 gradations for which the γ-value is maximized when pixels are driven using only the capacitive coupling HT method from coinciding with gradation level 200 (gradation value β) among the 255 gradations for which the γ-value is maximized when pixels constituted only by sub-pixels A (pixels in an MVA liquid crystal display in the related art) are driven using only the driving HT method (to make the gradation value β greater than the gradation value α).

As described above, an optimum combination of an HT technique for providing a threshold voltage difference in one pixel such as the capacitive coupling HT method and a driving HT technique is used to provide a liquid crystal display having high viewing angle characteristics for a wide range of gradations which has not been achievable with only either of those HT techniques. A liquid crystal display having high display characteristics without flickers or granularity on the display screen can be provided by optimizing the driving conditions for the driving HT method.

Embodiment 2

A liquid crystal display of the present embodiment has a configuration similar to that of the liquid crystal display in Embodiment 1 except that the ratio A:B between the areas of a sub-pixel A and a sub-pixel B is 4:6.

FIG. 17 is a graph showing viewing angle characteristics of VA type liquid crystal displays. The abscissa axis represents gradations of image data to be displayed, and the ordinate axis represents γ-values. The curve connecting black rhombic symbols in the figure indicates characteristics of the liquid crystal display of the present embodiment obtained in a direction square to the same. The curve connecting black triangular symbols in the figure indicates characteristics of a liquid crystal display in a direction oblique to the same obtained by driving it using only the capacitive coupling HT method without using the driving HT method. The curve connecting black squares in the figure indicates characteristics of a VA type liquid crystal display according to the related art in a direction oblique to the same obtained by driving it under the optimum HT driving conditions. The curve connecting circles in the figure indicates characteristics of the liquid crystal display of the present embodiment in a direction oblique to the same. The curve shown in a broken line in the figure indicates characteristics of a VA type liquid crystal display according to the related art employing neither the capacitive coupling HT method nor the driving HT method obtained in a direction oblique to the same. In FIG. 17, the viewing angle characteristics of each display in the oblique direction are measured with the γ-value for gradations of level 96 and higher in the square direction set at 2.4, and the characteristics represent local γ-values of each gradation.

In the present embodiment, the ratio between the areas of a sub-pixel A and a sub-pixel B is different from that in Embodiment 1. Therefore, as shown in FIG. 17, the peak of the improvement in the characteristics of the liquid crystal display employing only the capacitive coupling HT method (indicated by black triangles) in the oblique direction resides in the vicinity of gradation level 140 among 255 gradations, and the γ-value is 1.5 or more in a local range of gradation levels from about 128 to 150. Further, the γ-value is improved to about 1.0 in other ranges of gradations. In the present embodiment, since no change is made to the driving conditions for the driving HT method, the characteristics of the VA type liquid crystal display according to the related art employing only the driving HT method obtained in a direction oblique thereto (indicated by black squares).

Referring to the characteristics of the liquid crystal display driven by using the capacitive coupling HT method and the driving HT method in combination (indicated by circles), it will be understood that the γ-value exceeds 1.5 in a quite wide range of gradations, i.e., levels from 96 to 192 among the 255 gradations. Unlike the viewing angle characteristics of the corresponding display in Embodiment, the improvement in characteristics is somewhat smaller for low gradations (gradations of level 96 and lower). On the contrary, the γ-value is about 1.8 in the neighborhood of gradation level 128 among the 255 gradations, which means a greater improvement. Such an improvement is attributable to the fact that the effect of improving viewing angle characteristics is achieved in a wide range that is centered at intermediate gradations because the region of the intermediate gradations is improved by the capacitive coupling HT method and the region of high gradations above the intermediate gradation is improved by the driving HT method to consequently combine the effect of improving viewing angle characteristics of both methods.

As thus described, the present embodiment allows an image having intermediate gradations to be displayed properly, although it is somewhat less effective than Embodiment 1 for a dark image having low gradations. An image having many intermediate gradations frequently gives a significant sense of incompatibility especially when the image has a color different from the real color just as in the case of human skin, and the viewing angle characteristics achieved by the present embodiment may therefore be preferred to the characteristics achieved by Embodiment 1.

As described above, in the liquid crystal display of the present embodiment, the capacitive coupling HT method and the driving HT method are combined in an optimum manner to achieve high viewing angle characteristics for a wide range of gradations which has not been achievable with only either of the HT methods. In particular, in the liquid crystal display of the present embodiment, the region of intermediate gradations is improved by the capacitive coupling HT method and the region of high gradations above the intermediate gradation is improved by the driving HT method to consequently combine the effect of improving viewing angle characteristics of both methods. Thus, a significant effect of improving viewing angle characteristics can be achieved for intermediate gradations which are frequently used in an image that gives a significant sense of incompatibility when it has a color different from the real color just as in the case of human skin.

As described in Embodiments 1 and 2, it is important to set the ratio between the areas of the sub-pixels A and B and the ratios Vpx1 and Vpx2 of the voltages applied to the liquid crystal capacitances Clc1 and Clc2 of the sub-pixels A and B such that the regions improved by the capacitive coupling HT method and the driving HT method are appropriately combined instead of simply combining those methods. In particular, it is difficult in practice to improve low gradations up to the intermediate gradation using the driving HT method because of the speed of response of the liquid crystal. Therefore, it is adequate to implement the capacitive coupling HT method to be used in combination under such conditions that interpolation can be achieved to improve the low gradations up to the intermediate gradation. Referring to the conditions for the capacitive coupling HT method, for example, an area ratio A:B between the sub-pixels A and B in the excess of 5:5 is not adequate because the improvement is reduced on the side of low gradations.

However, it is not impossible to achieve the effect of improving the low gradations up to the intermediate gradation using the driving HT method. When a liquid crystal display is used in an application in which the display screen is at a great distance from a user just as in the case of an indication for public notice, granularity will not create a problem as shown in FIGS. 12A and 12B. Further, as shown in FIG. 8, flickers can be gradually made visually unperceivable as the frame frequency is made higher than a frequency of 60 Hz that is commonly used in the present. In particular, the driving frequency of one frame set T is determined to 120 Hz, flickers cannot be visually unperceivable. Accordingly, if the response characteristics of the peripheral driving circuits, the TFTs 20, and the liquid crystal are improved, the frame frequency can be increased to 120 Hz or higher without concern about flickers, and the center of improvement achieved by the driving HT method can therefore be set on the side of low gradations. On this case, the method may be combined with an HT process such as the capacitive coupling HT method in which a threshold voltage difference in one pixel is set such that an improvement will be centered on the side of high gradations.

For example, a pixel electrode 17 at a sub-pixel B is formed so as to occupy 50% or more of the total area of the pixel as a condition for implementing the capacitive coupling HT method. Driving is performed to set the ratio of presence between high-luminance frames and low-luminance frames (frame ratio) at n:1 (n≧1) as a condition for implementing the driving HT method. Since the ratio of sub-pixels B having a high threshold voltage in the display screen is thus increased, the center of an improvement in viewing angle characteristics achieved by the capacitive coupling HT method is set on the side of low gradations. Since the period of the high-luminance frames having high luminance becomes longer than the period of the low-luminance frames having low luminance as a result of the implementation of the driving HT method, an improvement is achieved on the side of high gradations. When the capacitive coupling HT method and the driving HT method are combined under such conditions, viewing angle characteristics are consequently improved for a wide range of gradations. It is obviously possible to adjust the frame ratio (T1:T2) of the high-luminance frames and the low-luminance frames in such a manner that a ratio of T1:T2=1:1 will be followed by a ratio of T1:T2=1:1.1 instead of being followed by a ratio of T1:T2=1:2 in a discrete manner.

The pixel electrode 17 at the sub-pixel B may be formed so as to occupy 50% or less of the total area of the pixel as another condition for implementing the capacitive coupling HT method. Driving may be performed to set the ratio of presence between high-luminance frames and low-luminance frames (frame ratio) at 1:n (n≧1) as another condition for implementing the driving HT method. Since the ratio of sub-pixels A having a low threshold voltage in the display screen is thus increased as a result of the implementation of the capacitive coupling HT method, the center of an improvement in viewing angle characteristics is set on the side of high gradations. Since the period of the high-luminance frames having high luminance becomes shorter than the period of the low-luminance frames having low luminance as a result of the implementation of the driving HT method, an improvement is achieved on the side of low gradations. When the capacitive coupling HT method and the driving HT method are combined under such conditions, viewing angle characteristics are consequently improved for a wide range of gradations. It is obviously possible to adjust the frame ratio (T1:T2) of the high-luminance frames and the low-luminance frames in such a manner that a ratio of T1:T2=1:1 will be followed by a ratio of T1:T2=1:1.1 instead of being followed by a ratio of T1:T2=1:2 in a discrete manner. Further, since the ratio of sub-pixels A having a low threshold voltage in the display screen increases, the transmittance of pixels at the same gradation voltage is improved, and it is therefore possible to provide a liquid crystal display having luminance higher than that of the liquid crystal display of Embodiments 1 and 2.

[Second Mode for Carrying Out the Invention]

A liquid crystal display in a second mode for carrying out the invention will now be described with reference to FIGS. 18 and 19. The liquid crystal display in the present mode for carrying out the invention is characterized in that it has a pixel group PGin constituted by a plurality of pixels in which pixel electrodes (first pixel electrodes) 16 and pixel electrodes (second pixel electrodes) 17 are provided in different ratios of presence. FIG. 18 shows 27 pixels among the plurality of pixels disposed in the form of a matrix in the liquid crystal display in the present mode for carrying out the invention. As shown in FIG. 18, a plurality of gate bus lines Gm extending in the horizontal direction in the figure are formed in parallel with each other on a glass substrate 10. A plurality of drain bus lines Drn, Dgn, and Dbn extending in the vertical direction in the figure are formed in parallel with each other so as to intersect the gate bus lines Gm with an insulation film (not shown) interposed between them.

A TFT 20 is provided in the vicinity of each of intersections between the gate bus lines Gm and the drain bus lines Drn, Dgn, and Dbn. Gate electrodes (G) are electrically connected to respective gate bus lines Gm, and drain electrodes (D) of the TFTs are electrically connected to respective drain bus lines Drn, Dgn, and Dbn. Source electrodes (S) are electrically connected to the pixel electrodes 16 through control electrodes 25, a pair of pixel electrodes 16 and 17 being formed separately from each other at each of pixels Prmn, Pgmn, and Pbmn.

A drain bus line Dr1 drives red (R) pixels Pr11, Pr21, and Pr31. A drain bus line Dg1 drives green (G) pixels Pg11, Pg21, and Pg31. A drain bus line Db1 drives blue (B) pixels Pb11, Pb21, and Pb31. Similarly, a drain bus line Drn drives an R pixel Prmn; a drain bus line Dgn drives a G pixel Pgmn; and a drain bus line Dbn drives a B pixel Pbmn. The pixels Prmn, Pgmn, and Pbmn have a sub-pixel (first sub-pixel) A at which a pixel electrode 16 is formed and a sub-pixel (second sub-pixel) B at which a pixel electrode 17 is formed. The pixel electrode 17 sandwiches an insulation film between itself and the control electrode 25 to form a control capacitance (a predetermined electric capacitance) Cc.

A pixel group PG11 includes nine pixels Pr11 to Pr31, Pg11 to Pg31, and Pb11 to Pb31 provided in the form of a matrix. Similarly, a pixel group PGin includes nine pixels.

The pixel group PG11 includes pixels Pr21, Pg11, and Pb31 (first pixels) in which the pixel electrodes 16 and 17 are formed in an area ratio of 1:9, pixels Pr11, Pg31, and Pb21 (second pixels) in which the area ratio is 2:8, and pixels Pr31, Pg21, and Pb11 (third pixels) in which the area ratio is 4:6. Similarly, a pixel group PGin includes three each of the first to the third pixels. The first to the third pixels are connected to each of drain bus lines Dr1, Dg1, and Db1. As a result, in the pixel group PG11, the total areas of the pixel electrodes 16 and 17 in the respective R pixels Pr11, Pr21, and Pr31 are equal to each other; the total areas of the pixel electrodes 16 and 17 in the respective G pixels Pg11, Pg21, and Pg31 are equal to each other; and the total areas of the pixel electrodes 16 and 17 in the respective B pixels Pb11, Pb21, and Pb31 are equal to each other. Similarly, in a pixel group PGin, the total areas of the pixel electrodes 16 and 17 formed in the respective R pixels, G pixels, and B pixels are equal to each other.

A CF resin layer and a common electrode (both of which are not shown) are formed in the order listed substantially throughout a surface of an opposite glass substrate (not shown) provided opposite to the glass substrate 10. Liquid crystal capacitances Clc1 and Clc2 are formed at each of pixels Prmn, Pgmn, and Pbmn by the common electrode, the pixel electrodes 16 and 17 and liquid crystal layers sandwiched between the electrodes. The liquid crystal capacitances Clc2 are series-connected to the control capacitances Cc between the glass substrate 10 and the opposite glass substrate. As a result, sub-pixels A and B having different threshold voltages are formed at the pixels Prmn, Pgmn, and Pbmn.

FIG. 19 is a graph showing viewing angle characteristics of VA type liquid crystal displays. The abscissa axis represents gradations of image data to be displayed, and the ordinate axis represents γ-values. The curve connecting black rhombuses in the figure indicates characteristics of the liquid crystal display in the present mode for carrying out the invention measured in a direction square to the same. The curve connecting squares in the figure indicates characteristics of a liquid crystal display having only the first pixels formed such that the ratio between the areas of the pixel electrodes 16 and 17 is 1:9 measured in a direction oblique to the display. The curve connecting triangles in the figure indicates characteristics of a liquid crystal display having only the second pixels formed such that the ratio between the areas of the pixel electrodes 16 and 17 is 2:8 measured in a direction oblique to the display. The curve connecting crosses in the figure indicates characteristics of a liquid crystal display having only the third pixels formed such that the ratio between the areas of the pixel electrodes 16 and 17 is 4:6 measured in a direction oblique to the display. The curve connecting black circles in the figure indicates characteristics of the liquid crystal display in the present mode for carrying out the invention measured in a direction oblique to the display. The curve shown in a broken line in the figure indicates characteristics of a VA type liquid crystal display according to the related which does not employ the capacitive coupling HT method, measured in a direction oblique to the display. In FIG. 19, the viewing angle characteristics of each display in the oblique direction are measured with the γ-value for gradations at level 96 or higher in the square direction set at 2.4, and the characteristics represent local γ-values of each gradation.

As shown in FIG. 19, when the pixel electrodes 16 and 17 are formed in different area ratios, viewing angle characteristics can be improved in different ranges of gradations (see the square symbols, triangular symbols, and crosses). The range of improved gradations is shifted to higher gradations, the smaller the area of the sub-pixels B having the pixel electrodes 17 which are capacitively coupled. Since the plurality of pixels Prmn, Pgmn, and Pbmn having different area ratios between the pixel electrodes 16 and 17 are distributed in the display area, the range of improvable gradations is increased. As a result, the viewing angle characteristics are averaged in a global view, and the characteristics are improved for a wide range of gradations (see black circles). Since the γ-value of the liquid crystal display is 1 or more for a wide range from a low gradation (gradation level 32) to a high gradation (gradation level 255). Since the display does not employ the different HT techniques (the driving HT method and the capacitive coupling HT method) in combination, the viewing angle characteristics of the same are not improved as much as achieved in the liquid crystal display in the first mode for carrying out the invention. However, in the liquid crystal display in the present mode for carrying out the invention, it is possible to solve the problem of the capacitive coupling HT method, i.e., the narrowness of the range of gradations that the method can improve.

As described above, since the plurality of pixels Prmn, Pgmn, and Pbmn having different area ratios between the pixel electrodes 16 and 17 are distributed in the display area, the viewing angle characteristics of each of the pixels Prmn, Pgmn, and Pbmn are synthesized in a global view. As a result the viewing angle characteristics of the liquid crystal display are improved for a wide range of gradations. Since the viewing angle characteristics are improved evenly, high display quality can be provided when display of a dynamic image such as a television image is viewed.

[Third Mode for Carrying Out the Invention]

A liquid crystal display in a third mode for carrying out the invention will now be described with reference to FIGS. 20 and 21. The liquid crystal display in the present mode for carrying out the invention is characterized in that it includes a pixel group constituted by a plurality of pixels having control capacitances (predetermined electric capacitances) of different capacitance values. FIG. 20 shows an equivalent circuit of four pixels among the plurality of pixels, which are disposed in the form of a matrix, of the liquid crystal display in the present mode for carrying out the invention. As shown in FIG. 20, a plurality of gate bus lines 12 extending in the horizontal direction in the figure are formed in parallel with each other on a glass substrate. A plurality of drain bus lines 14 extending in vertical direction in the figure are formed in parallel with each other so as to intersect with the gate bus lines 12 with an insulation film 30 interposed between them.

A TFT 20 is provided in the vicinity of each of intersections between the gate bus lines 12 and the drain bus lines 14. Gate electrodes (G) of the TFTs 20 are electrically connected to the respective gate bus lines 12, and drain electrodes (D) are electrically connected to the respective drain bus lines 14. Storage capacitor bus lines 18 are formed across pixel regions defined by the gate bus lines 12 and the drain bus lines 14 so as to extend in parallel with the gate bus lines 12. A storage capacitor electrode (intermediate electrode) 19 is formed above the storage capacitor bus line 18 at each pixel with an insulation film 30 interposed between them. The storage capacitor electrode 19 is electrically connected to a source electrode (S) of the TFT 20 through a control electrode 25. A storage capacitor Cs is formed by the storage capacitor bus line 18, the storage capacitor electrode 19, and the insulation film 30 sandwiched between them.

A pixel region defined by gate bus lines 12 and drain bus lines 14 is divided into a sub-pixel (first sub-pixel) A and a sub-pixel (second sub-pixel) B. A pixel electrode (first pixel electrode) 16 is formed at the sub-pixel A, and a pixel electrode (second pixel electrode) 17, which is separate from the pixel electrode 16, is formed at the sub-pixel B. The pixel electrodes 16 and 17 are formed in an area ratio of 3:7. The pixel electrode 16 is electrically connected to the storage capacitor electrode 19 and the source electrode (S) of the TFT 20. A control capacitance is formed by the pixel electrode 17, the control electrode 25, and a protective film 32 sandwiched by the electrodes 17 and 25. The pixel electrode 17 is indirectly connected to the source electrode (S) by capacitive coupling through the control capacitance. The pixel electrode 17 is in an electrical floating state.

Referring to FIG. 20, the value of the control capacitances formed in the pixels disposed at the top left and bottom right of the figure is different from that of the control capacitances in the pixels disposed at the top right and bottom left. Control capacitances Cc1 are formed in the pixels disposed at the top left and bottom right, and control capacitances Cc2 are formed in the pixels disposed at the top right and bottom left. For example, the capacitance values can be changed by varying the area of the control electrode 25 between the pixels in which the control capacitances Cc1 are formed and the pixels in which the control capacitances Cc2 are formed. As thus described, a pixel group 39 has a plurality of (four in FIG. 20) pixels having control capacitances Cc1 and Cc2 of different capacitance values.

A CF resin layer (not shown) and a common electrode 42 are formed in the order listed on an opposite glass substrate provided opposite to the glass substrate 10. Liquid crystal capacitances Clc1 are formed by the pixel electrodes 16 of the sub-pixels A, the common electrode 42 and a liquid crystal layer 6 sandwiched between the electrodes 16 and 42. Liquid crystal capacitances Clc2 are formed by the pixel electrodes 17 of the sub-pixels B having the control capacitances Cc1, the common electrode 42, and the liquid crystal layer 6 sandwiched between the electrodes 17 and 42. Liquid crystal capacitances Clc2 are formed by the pixel electrodes 17 of the sub-pixels B having the control capacitances Cc2, the common electrode 42, and the liquid crystal layer 6 sandwiched between the electrodes 17 and 42. The control capacitances Cc1 and the liquid crystal capacitances Clc2 are series connected between the glass substrate 10 and the opposite glass substrate. Similarly, the control capacitances Cc2 and the liquid crystal capacitances Clc2 are series-connected between the glass substrate 10 and the opposite glass substrate.

When a TFT 20 is turned on, a gradation voltage applied to the drain bus line 14 is applied to the pixel electrode 16 through the TFT 20, and a voltage Vpx1 is applied to the liquid crystal layer 6 of the sub-pixel A. At thus time, since the voltage Vpx1 is divided according to the capacitance ratio between the liquid crystal capacitance Clc2 and the control capacitance Cc1, a voltage different from that applied to the pixel electrode 16 is applied to the pixel electrode 17 at the sub-pixel B having the control capacitance Cc1. A voltage Vpx21 applied to the liquid crystal layer 6 at the sub-pixel B can be expressed as follows.

$$Vpx21 = (Cc1/(Clc2 + Cc1)) \times Vpx1 \quad \text{Expression 3}$$

Similarly, a voltage Vpx22 applied to the liquid crystal layer 6 at the sub-pixel B having the control capacitance Cc2 can be expressed as follows.

$$Vpx22 = (Cc2/(Clc2 + Cc2)) \times Vpx1 \quad \text{Expression 4}$$

The value of the control capacitance Cc1 is set such that the voltage ratio Vpx21/Vpx1 of the pixel having the capacitance becomes 0.8 for the intermediate gradation (gradation level 127). The value of the control capacitance Cc2 is set such that the voltage ratio Vpx22/Vpx1 of the pixel having the capacitance becomes 0.59 for the intermediate gradation (gradation level 127). As thus described, the display area of the liquid crystal display has a structure in which a pixel group 39 constituted by pixels including sub-pixels having different threshold voltages is provided.

FIG. 21 is a graph showing viewing angle characteristics of VA type liquid crystal displays. The abscissa axis represents gradations of image data to be displayed, and the ordinate axis represents γ-values. The curve connecting black rhombic symbols in the figure indicates characteristics of the liquid crystal display of the present embodiment obtained in a direction square to the same. The curve connecting square symbols in the figure indicates characteristics of a liquid crystal display in which all pixels are formed to have the control capacitance Cc1, the characteristics being obtained in a direction oblique to the display. The curve connecting triangular symbols in the figure indicates characteristics of a liquid crystal display in which all pixels are formed to have the control capacitance Cc2, the characteristics being obtained in a direction oblique to the display. The curve connecting black square symbols in the figure indicates characteristics of the liquid crystal display in the present mode for carrying out the invention obtained in a direction oblique to the same. The curve shown in a broken line in the figure indicates characteristics of a VA type liquid crystal display according to the related art which does not employ the capacitive coupling HT method, the characteristics being obtained in a direction oblique to the display. In FIG. 21, the viewing angle characteristics of each display in the oblique direction are measured with the γ-value for gradations at level 96 and higher in the square direction set at 2.4, and the characteristics represent local γ-values of each gradation.

As shown in FIG. 21, when the capacitance values of the control capacitances Cc1 and Cc2 are made different from each other to provide different voltage ratios Vpx21/Vpx1 and Vpx22/Vpx1, viewing angle characteristics can be improved in different ranges of gradations (see the square and triangular symbols). A range of improvable gradations is shifted to high gradations, the smaller the relevant voltage ratio. Since a plurality of pixels having different voltage ratios Vpx21/Vpx1 and Vpx22/Vpx1 are distributed in the display area, the range of improvable gradations is increased. As a result, the viewing angle characteristics are averaged in a global view, and the characteristics are improved for a wide range of gradations (see black square symbols). Since the γ-value of the liquid crystal display is 1 or more for a wide range from a low gradation (gradation level 32) to a high gradation (gradation level 255). Since the display does not employ the different HT techniques (the driving HT method and the capacitive coupling HT method) in combination as the same of the above second mode for carrying out the invention, the viewing angle characteristics of the same are not improved as much as achieved in the liquid crystal display in the first mode for carrying out the invention. However, in the liquid crystal display in the present mode for carrying out the invention, it is possible to solve the problem of the capacitive coupling HT method, i.e., the narrowness of the range of gradations that the method can improve.

As described above, the control capacitances Cc1 and Cc2 are provided with different capacitance values to distribute a plurality of pixels having different voltage ratios Vpx21/Vpx1 and Vpx22/Vpx1 in the display screen, which allows viewing angle characteristics to be synthesized between the pixels in a global view. Since the viewing angle characteristics of the liquid crystal display are thus improved for a wide range of gradations, high display quality can be achieved.

The invention is not limited to the above-described modes for carrying out the same and may be modified in various ways.

In the liquid crystal display in the second mode for carrying out the invention, the control capacitances Cc formed in all pixels have the same capacitance value. The invention is not limited to such a configuration. For example, the control capacitance value Cc of any of the pixels Prmn, Pgmn, and Pbmn of the pixel group PGin may have a capacitance value that is different from the capacitance value of the rest of the pixels Prmn, Pgmn, and Pbmn. Alternatively, the control capacitances Cc formed at the pixels Prmn, Pgmn, and Pbmn may be different from each other. The same advantage as that in the second and the third modes for carrying out the invention can be achieved also in this case.

In the liquid crystal display in the third mode for carrying out the invention, the pixel electrodes 16 and 17 are formed to have the same area ratio at all pixels. The invention is not limited to such a configuration. For example, the area ratio between the pixel electrodes 16 and 17 of any of the pixels in the pixel group 39 may be different from that of the other pixels. Alternatively, the pixels in the pixel group 39 may be different from each other in the area ratio between the pixel electrodes 16 and 17. The same advantage as that in the second and the third modes for carrying out the invention can be achieved also in this case.

Although the liquid crystal displays in the second and the third modes for carrying out the invention employs only the capacitive coupling HT method, this is not limiting the invention. For example, the driving HT method may obviously be employed in the liquid crystal displays in the second and the third modes for carrying out the invention. High-luminance frames and low-luminance frames may be allocated to each of pixels which are different from each other in the area ratio between the first and the second pixel electrodes or the capacitance value of the control capacitance Cc such that the relationship between a gradation value in input image data and an applied voltage will be different in each pixel. The same advantage as that in the first mode for carrying out the invention can be achieved also in this case.

Although the liquid crystal displays in the first to the third modes for carrying out the invention have been described as VA (MVA) type liquid crystal displays by way of example, the invention is not limited to them. The same advantage as that in those modes for carrying out the invention can be achieved also in TN type liquid crystal displays.

What is claimed is:

1. A liquid crystal display comprising:
a liquid crystal sealed between a pair of substrates provided opposite to each other;
a plurality of pixels provided in a form of a matrix on either of the pair of substrates;
a thin film transistor formed at each of the pixels;
an image processing unit for determining a high luminance of the pixel in a high-luminance frame and a low luminance of the pixel in a low-luminance frame and the ratio of presence between the high-luminance frame and the low-luminance frame to achieve luminance substantially equal to predetermined luminance by combining the high-luminance frame which drives the pixel to luminance higher than the predetermined luminance that is associated with a gradation value in input image data and the low-luminance frame which drives the pixel to luminance lower than the predetermined luminance;
a first sub-pixel formed in the pixel, wherein a first pixel electrode is formed in the first sub-pixel and electrically connected to a source electrode of the thin film transistor through a control electrode and a contact hole; and
a second sub-pixel which is formed in the pixel separately from the first sub-pixel and which provides luminance per unit area lower than that of the first sub-pixel.

2. A liquid crystal display according to claim 1, wherein the image processing unit is incorporated in a control circuit which controls a driving circuit for driving a gate bus line electrically connected to a gate electrode of the thin film transistor and a driving circuit for driving a drain bus line electrically connected to a drain electrode of the thin film transistor.

3. A liquid crystal display according to claim 1, comprising a gradation conversion table having a high luminance gradation value for obtaining the high luminance in the high-luminance frame and a low luminance gradation value for obtaining the low luminance in the low-luminance frame.

4. A liquid crystal display according to claim 3, wherein the gradation conversion table is stored in a storage circuit.

5. A liquid crystal display according to claim 4, wherein the gradation conversion table is incorporated in the control circuit.

6. A liquid crystal display according to claim 1, wherein the liquid crystal has negative dielectric constant anisotropy and is aligned substantially perpendicularly to a substrate surface when no voltage is applied.

7. A liquid crystal display comprising:
a liquid crystal sealed between a pair of substrates provided opposite to each other:
a plurality of pixels provided in a form of a matrix on either of the pair of substrates;
a thin film transistor formed at each of the pixels;
an image processing unit for determining a high luminance of the pixel in a high-luminance frame and a low luminance of the pixel in a low-luminance frame and the ratio of presence between the high-luminance frame and the low-luminance frame to achieve luminance substantially equal to predetermined luminance by combining the high-luminance frame which drives the pixel to luminance higher than the predetermined luminance that is associated with a gradation value in input image data and the low-luminance frame which drives the pixel to luminance lower than the predetermined luminance;
a first sub-pixel formed in the pixel, a first pixel electrode formed in the first sub-pixel and electrically connected to a source electrode of the thin film transistor through a control electrode; and
a second sub-pixel which is formed in the pixel separately from the first sub-pixel and which provides luminance per unit area lower than that of the first sub-pixel,
wherein the pixel includes a second pixel electrode which sandwiches an insulation film between itself and the control electrode to form a predetermined electric capacitance and which is formed in the second sub-pixel separately from the first pixel electrode.

8. A liquid crystal display according to claim 7, wherein the second pixel electrode is formed so as to occupy 50% or more of the total area of the pixel and wherein driving is performed to set the ratio of presence between the high-luminance frame and the low-luminance frame is set at n:1 ($n \geq 1$).

9. A liquid crystal display according to claim 7, wherein the second pixel electrode is formed so as to occupy 50% or less of the total area of the pixel and wherein driving is performed to set the ratio of presence between the high-luminance frame and the low-luminance frame is set at 1:n ($n \geq 1$).

10. A liquid crystal display according to claim 7, wherein:
the other of the pair of substrates has a common electrode; and
a voltage applied to a liquid crystal capacitance formed between the second pixel electrode and the control electrode is generated based on the capacitance ratio between the liquid crystal capacitance and the predetermined electric capacitance.

11. A liquid crystal display comprising:
a liquid crystal sealed between a pair of substrates provided opposite to each other:
a plurality of pixels provided in a form of a matrix on either of the pair of substrates;
a thin film transistor formed at each of the pixels;
an image processing unit for determining a high luminance of the pixel in a high-luminance frame and a low luminance of the pixel in a low-luminance frame and the ratio of presence between the high-luminance frame and the low-luminance frame to achieve luminance substantially equal to predetermined luminance by combining the high-luminance frame which drives the pixel to luminance higher than the predetermined luminance that is associated with a gradation value in input image data and the low-luminance frame which drives the pixel to luminance lower than the predetermined luminance;
a first sub-pixel formed in the pixel, a first pixel electrode formed in the first sub-pixel and electrically connected to a source electrode of the thin film transistor through a control electrode; and
a second sub-pixel which is formed in the pixel separately from the first sub-pixel and which provides luminance per unit area lower than that of the first sub-pixel,
wherein a gradation value $\alpha$ obtained at the pixel with a maximum $\gamma$-value when driven without processing the input image data at the image processing unit does not coincide with a gradation value $\beta$ obtained with the maximum $\gamma$-value at a pixel which includes only the first sub-pixel and which is driven by processing the image data at the image processing unit within a predetermined range of gradation values, the γ-value being given by:

$$\gamma = \{\log(Ta) - \log(Tb)\} / \{\log(a) - \log(b)\}$$

where T represents the maximum luminance in optical characteristics measured at a predetermined angle to a direction normal to the display screen; ta represents luminance based on a gradation value a; tb represents luminance based on a gradation value b (a and b are different values); and Ta and Tb represent the ratios of the luminance ta and the luminance tb to the maximum luminance T, respectively.

12. A liquid crystal display according to claim 11, wherein the gradation value β is a value greater than the gradation value α.

13. A liquid crystal display comprising:
a liquid crystal sealed between a pair of substrates provided opposite to each other;
a plurality of gate bus lines formed in parallel with each other on one of the pair of substrates;
a plurality of drain bus lines formed across the plurality of gate bus lines with an insulation film interposed between them;
a thin film transistor provided at each of intersections between the bus lines and having a gate electrode electrically connected to the gate bus line, a drain electrode electrically connected to the drain bus line, and a source electrode provided above the gate electrode so as to face the drain electrode with a predetermined gap left between them; and
a pixel group including a plurality of pixels different from each other in the area ratio between a first pixel electrode which is electrically connected to the source electrode through a control electrode and a second pixel electrode which is separate from the first pixel electrode and which sandwiches an insulation film between itself and the control electrode to form a predetermined electric capacitance.

14. A liquid crystal display according to claim 13, wherein the pixel group includes a first pixel formed such that the area ratio between the first pixel electrode and the second pixel electrode becomes 1:9, a second pixel formed such that the area ratio between the first pixel electrode and the second pixel electrode becomes 2:8, and a third pixel formed such that the area ratio between the first pixel electrode and the second pixel electrode becomes 4:6.

15. A liquid crystal display according to claim 13, wherein the capacitance value of the predetermined electric capacitance of any of the pixels in the pixel group is different from that of the remaining pixels.

16. A liquid crystal display according to claim 13, wherein the relationship between a gradation value in input image data and a voltage applied to the pixels is different in each of the pixels which are different from each other in the area ratio between the first and second pixel electrodes or the capacitance value of the predetermined electric capacitance.

17. A liquid crystal display comprising:
a liquid crystal sealed between a pair of substrates provided opposite to each other;
a plurality of gate bus lines formed in parallel with each other on one of the pair of substrates;
a plurality of drain bus lines formed across the plurality of gate bus lines with an insulation film interposed between them;
a thin film transistor provided at each of intersections between the bus lines and having a gate electrode electrically connected to the gate bus line, a drain electrode electrically connected to the drain bus line, and a source electrode provided above the gate electrode so as to face the drain electrode with a predetermined gap left between them; and
a pixel group including a plurality of pixels, wherein the capacitance value of a predetermined electric capacitance formed by an insulation film sandwiched between a second pixel electrode and a control electrode is different between the pixels, the second electrode being separate from a first pixel electrode which is electrically connected to the source electrode through the control electrode.

18. A liquid crystal display according to claim 17, wherein the area ratio between the first and second pixel electrodes in any of the pixels in the pixel group is different from that in the remaining pixels.

* * * * *